United States Patent
Hosotani et al.

(10) Patent No.: US 6,788,556 B2
(45) Date of Patent: Sep. 7, 2004

(54) SWITCHING POWER SOURCE DEVICE

(75) Inventors: Tatsuya Hosotani, Muko (JP); Hiroshi Takemura, Muko (JP)

(73) Assignee: Murata Manufacturing Co., Ltd., Kyoto-Ku (JP)

(*) Notice: Subject to any disclaimer, the term of this patent is extended or adjusted under 35 U.S.C. 154(b) by 2 days.

(21) Appl. No.: 10/348,023

(22) Filed: Jan. 22, 2003

(65) Prior Publication Data

US 2003/0142521 A1 Jul. 31, 2003

(30) Foreign Application Priority Data

Jan. 25, 2002 (JP) ........................................ 2002-017398

(51) Int. Cl.$^7$ ............................................ H02M 3/335
(52) U.S. Cl. ............................... 363/21.15; 363/21.16; 363/21.02; 363/56.1
(58) Field of Search ......................... 363/21.15, 21.16, 363/21.02, 56.1, 131, 21.01; 361/93.1, 93.9

(56) References Cited

U.S. PATENT DOCUMENTS 4,914,560 A * 4/1990 Oh et al. .................... 363/56.1
5,835,361 A * 11/1998 Fitzgerald ................ 363/21.03

FOREIGN PATENT DOCUMENTS

JP   1-248965 A   10/1989
JP   2-280667 A   11/1990

* cited by examiner

*Primary Examiner*—Shawn Riley

(57) ABSTRACT

A switching power source device includes a peak current limiting circuit in which peak current flowing through a first switching element is detected, and when the current reaches a predetermined value, transistors are turned on in succession to increase the quantity of an electrical signal whereby the first switching element is rapidly turned off, and an on-time limiting circuit for reducing the on-time using reduction of the output voltage. The switching power source device is operated so as to repeat starting and stopping due to a turn-on delay circuit when the output is shortcircuited for reduction of the shortcircuit current.

29 Claims, 16 Drawing Sheets

SWITCHING POWER SOURCE DEVICE

BACKGROUND OF THE INVENTION

1. Field of the Invention

The present invention relates to a switching power source device, and more particularly, to a self-excited oscillation type switching power source device provided with an overcurrent protection circuit.

2. Description of the Related Art

FIG. 14 is a circuit diagram of a switching power source device (example 1) disclosed in U.S. patent application Ser. No. 10/232,901 filed on Sep. 3, 2002.

A first switching circuit S1 and an input power source Vin are connected in series with a series circuit of a primary winding T1 and an inductor L of a transformer T.

A series circuit including a second switching circuit S2 and a capacitor C is connected in parallel to a series circuit including a primary wiring T1 and an inductor L of a transformer T.

A series circuit including a second switching circuit S2 and a capacitor is connected in parallel with the series circuit including the first switching circuit S1 and the inductor L.

A rectification-smoothing circuit including a rectification element Ds is provided for a secondary winding T2 of the transformer T.

The first switching circuit S1 is a circuit including a first switching element Q1, a first diode D1, and a first capacitor C1 connected in parallel to each other. The second switching circuit S2 is a circuit including a second switching element Q2, a second diode D2, and a second capacitor C2 connected in parallel to each other.

A switching control circuit is connected between a first driving winding T3 provided for the transformer T and the control terminal of the first switching element Q1, and also between a second driving winding T4 and the control terminal of the second switching element Q2, respectively.

The switching control circuit controls such that the first and second switching elements Q1 and Q2 are alternately turned on/off while the off-period when both of the first and second switching elements Q1 and Q2 are turned off is interposed between the on/off operations. Energy is stored in the primary winding T1 and the inductor L during the on-period of the first switching element Q1, and the energy is released during the off-period of the first switching element Q1, and thus, the first and second switching elements Q1 and Q2 are self-excited-oscillated.

Referring to the above-described configuration, the inductor L and the capacitor C constitute a resonance circuit which resonates during the off-period of the first switching element Q1.

The above-described switching control circuit includes an on-period control circuit set at a time constant at which the first switching element Q1 is turned off at a predetermined time after the first switching element Q1 is turned on, and a second on-period control circuit set at a time constant at which the second switching element Q2 is turned off, such that the resonance current flows through the series circuit, including the second switching element Q2 and the inductor L, after the second switching element Q2 is turned on and before the energy release from the second winding is completed. Thereby, the switching control circuit is operated in a continuous current mode.

Furthermore, an overcurrent protection circuit is provided. The overcurrent protection circuit includes a resistor R which is a current-detecting device connected in series with the first switching element Q1, and limits the on-period of the first switching element Q1 when the current detected by the resistor R reaches a threshold.

The operation of the overcurrent protection circuit is as follows. The transistor Tr2 is connected to the control terminal of the first switching element Q1. A voltage developed across the above-described current-detecting device (the resistor R) is applied to the control terminal of the transistor Tr2 via a resistor R6. When the current flowing through the first switching element Q1 reaches a predetermined value, the control terminal voltage of the transistor Tr2 reaches a threshold to be turned on, causing the first switching element Q1 to turn off so that the peak current flowing through the first switching element Q1 is limited. FIG. 16 shows the waveform of current Id1 flowing through first switching element Q1 which is generated when the output voltage is reduced. As seen in FIG. 16, when the output voltage is reduced, the off-period of the first switching element Q1 is kept substantially constant and the on-period is reduced. Accordingly, the switching frequency is increased, which increases the switching loss, and also, the output current is increased.

FIG. 15 shows an example of a ringing choke converter provided with a peak current limiting circuit (an example 2). When the peak current flowing through the first switching element Q1 reaches a predetermined value, the transistor Tr4 is turned on, and the first switching element Q1 is turned off.

FIG. 17 shows the waveform of current Id1, flowing through the first switching element Q1, which is generated when the output voltage is reduced. As seen in FIG. 17, as the off-period of the first switching element Q1 is increased, the switching frequency is decreased in correspondence with the reduction of the output voltage. Therefore, the increase of the switching loss is suppressed, and the output current is increased.

The above-described switching power source device and ringing choke converter have the following defects.

(1) The delay time from the time when the current flowing through the first switching element Q1 is detected and the detected voltage reaches the base-emitter threshold voltage of the transistor Tr2 to the time when the transistor Tr2 is turned on, is long. Therefore, the on-time cannot be reduced to be short, the secondary current is increased and a secondary rectification diode and so forth may be broken.

One of the reasons for this is that the transistor TR2 cannot be turned on immediately after the detection voltage reaches the base-emitter threshold voltage of the transistor Tr2. Sufficient base current is required to turn on the transistor Tr2. The time required for securing the base current is the delay time. Thus, the on-period cannot be reduced to be sufficiently short, and the output power is increased. Moreover, when the first switching element Q1 is turned off by the transistor TR2, the current flowing through the first switching element Q1 is reduced, and the voltage applied across both ends of the resistor R is reduced. When this voltage becomes less than the base-emitter threshold voltage of the transistor Tr2, the transistor Tr2 cannot be turned on. Thus, the on-speed is rapidly reduced. When the on speed of the transistor Tr2 is low, and the delay time is long, the turn-off speed of the first switching element Q1 becomes low. Thus, the switching loss is increased, and also, the on-period cannot be reduced when an overcurrent exists. The increase of the output current is more than that caused when the output voltage of the device is reduced. When the output voltage of the device is increased, inconveniences such as breaking of a primary diode and so forth are caused. Therefore, it is indispensable to rapidly turn off the first switching element Q1.

(2) When the primary peak current is limited to a predetermined value, the output power is restricted to have a substantially constant value. When the output voltage is reduced, the output current is increased. Thus, a secondary rectification diode and so forth may be broken.

(3) When the output is shortcircuited, the shortcircuit current is increased. Thus, a secondary rectification diode and so forth may be broken.

SUMMARY OF THE INVENTION

In order to overcome the problems described above, preferred embodiments of the present invention provide a self-excitation oscillation type switching power source device having an overcurrent protection circuit, in which a transistor circuit for controlling a first switching element Q1 has an improved configuration in which when the primary peak current becomes a predetermined current, the first switching element Q1 is rapidly turned off to suppress the peak current and thereby limit the output power, and when the output current of the device is increased and the output voltage is decreased, the output power is reduced, and hence, the increase of the shortcircuit current at shortcircuiting of the output can be prevented and minimized.

According to a first preferred embodiment of the present invention, a switching power source device, which carries out self-excitation oscillation, includes a primary winding T1 of a transformer T, a first switching element Q1, a current detecting device R and an input power source Vin connected in series, a rectification-smoothing circuit provided for a secondary winding T2 of the transformer T, a switching control circuit connected to a first drive winding T3 provided in the transformer T and being operable to turn on/off the first switching element Q1 to control the on-period of the first switching element Q1 and thereby control the output voltage of the device, the switching control circuit being operable to perform a control function so as to turn on a first switching device connected to the control terminal of the first switching element Q1 and thereby turn off the first switching element a predetermined period after the first switching element Q1 is turned on by a voltage developed in the first drive winding T3, the predetermined period being determined by a time constant circuit, and an overcurrent protection circuit including an on-period limiting circuit and a peak current limiting circuit, the on-period limiting circuit being operable to set the maximum on-period of the first switching element Q1 with the time constant circuit, the peak current limiting circuit including the current detection device R for detecting the peak current flowing through the first switching element Q1, a second switching device which is turned on when the detected current becomes a predetermined peak current, and a third switching device which is turned on by the turning on of the second switching device, the third switching device being connected to the control terminal of the first switching device and whereby the first switching element Q1 is turned off by the turning on of the third switching device.

Thus, the present invention provides a novel, greatly improved self-excitation oscillation type switching power source device.

According to the configuration of preferred embodiments of the present invention, when a peak current having a predetermined value is detected by the peak current limiting circuit, the second switching device is turned on, and further the second switching device is turned on, and the third switching device is caused to turn on by the turning on of the second switching device. The first switching device is turned on by the turning on of the third switching device, which causes the first switching element Q1 to turn off. Alternatively, the first switching element Q1 is turned off directly by the turning on of the third switching device and not by the turning on of the first switching device.

According to the above-described configuration, when a peak current having a predetermined value is detected, the second switching device is turned on, and then, the third switching device is turned on. Thereby, the electrical signal can be amplified, so that the first switching device is turned on, or the first switching element Q1 is turned off. Hence, when the peak current having a predetermined value is detected, the first switching element Q1 can be rapidly turned off.

Moreover, according to a second preferred embodiment of the present invention, a switching power source device which carries out self-excitation oscillation includes a series circuit including a primary winding T1 of a transformer T and an inductor L, a first switching circuit S1, a current detecting device R, and an input power source Vin connected in series with the series circuit including the primary winding T1 and the inductor L, a series circuit including a second switching circuit S2 and a capacitor C of which one end is connected to a node between the series circuit including the primary winding of the transformer T and the inductor L, the first switching circuit S1 including a parallel connection circuit that includes a first switching element Q1, a first diode D1, and a first capacitor C1, the second switching circuit S2 including a parallel connection circuit that includes a second switching element Q2, a second diode D2, and a second capacitor C2, the transformer T having a first drive winding T3 for generating a voltage which causes the first switching element Q1 to conduct, and a second drive winding T4 for generating a voltage which causes the second switching element Q2 to conduct, a rectification-smoothing circuit provided for a secondary winding of the transformer T and a switching control circuit for turning on/off the first and second switching elements Q1 and Q2 while a period in which both switching elements Q1 and Q2 are off is interposed between the on/off operations. The device preferably otherwise has the same configuration as described with respect to the above-described preferred embodiment.

In particular, in the switching power source device, the switching control circuit is controllable so as to turn on the first switching device connected to the control terminal of the first switching element Q1 and thereby turn off the first switching element at a predetermined period after the first switching element Q1 is caused to turn on by a voltage developed in the first drive winding T3, the predetermined period being determined by a time constant circuit, and an overcurrent protection circuit including an on-period limiting circuit and a peak current limiting circuit is provided, the on-period limiting circuit having the time constant circuit for setting the maximum on-period of the first switching element Q1, the peak current limiting circuit including the current detection device R for detecting the peak current flowing through the first switching element Q1, a second switching device which is turned on when the current becomes a predetermined peak current, and a third switching device which is turned on by the turning on of the second switching device, the third switching device being connected to the control terminal of the first switching device whereby the first switching element Q1 is turned off by turning on of the third switching device.

According to the above-described configuration, when a peak current having a predetermined value is detected, the second switching device is turned on, and then, the third switching device is turned on. Thereby, the electrical signal can be amplified, so that the first switching device is turned on or the first switching element Q1 is turned off. Hence, when a peak current, having a predetermined value, is detected, the first switching element Q1 can be rapidly turned off. In a two-transistor self-excitation oscillation type switching power source device, when the peak current is restricted to limit the output power, the on-period of the first switching element Q1 is decreased with the output voltage being reduced, while the off-period is kept substantially constant. Accordingly, the switching frequency is greatly improved, and the output power is significantly increased. It is especially important to detect the peak current and rapidly turn off the first switching element Q1 from the standpoints of suppressing of the output current from increasing and also suppressing of the switching loss from increasing.

Preferably, the first switching device includes a transistor, and the time constant circuit includes an impedance circuit and a capacitor to be charged and discharged which are connected to the control terminal of the transistor.

Since the first switching device includes a transistor, the charge voltage of the capacitor and the threshold value (the base-emitter voltage of for example, about 0.6 V) can be compared. Thus, the number of elements or component parts can be reduced due to this simple configuration. This serves to reduce the size and weight of the switching power source device and also the cost thereof.

Preferably, the impedance circuit includes a photocoupler for changing the impedance and controlling the on-period of the first switching element Q1, to thereby control the output voltage of the device.

Also, preferably, the impedance circuit sets the impedances at the charging and discharging of the charge/discharge capacitor in such a manner that the maximum on-period of the first switching element Q1 is decreased with the output voltage being reduced.

The charging-period of the charging/discharging capacitor is constant in the stationary state in which the input-output voltage and the load current are not changed, since the charging/discharging cycle is repeated. However, with the output voltage being reduced, the charge of the capacitor cannot be completely discharged, thereby reducing the charging period. As a result, the on-timing of the first switching device becomes earlier, and the maximum on-period of the first switching element Q1 is reduced. Thereby, the output power is reduced, so that the output current can be reduced.

Preferably, the switching control circuit has a delay circuit including a resistor or a series circuit including a resistor and a capacitor, the delay circuit being provided between the first drive winding T3 and the control terminal of the first switching element Q1. The impedance of the delay circuit is set in such a manner that when the output voltage of the device is reduced to be lower than a predetermined value, the impedance of the delay circuit prevents the first switching element Q1 from turning on, which is caused by the voltage developed in the first drive winding. The device is operated in an operation mode in which the starting and the stopping are repeated.

The delay circuit applies a voltage to the control terminal of the first switching element Q1 at a predetermined time after the voltage is developed in the first drive-winding T3. When the output voltage is reduced to be less than the predetermined voltage, the fly-back voltage generated in the first drive-winding T3 is reduced, so that turning on of the first switching element Q1 is prevented. In particular, the fly-back voltage is divided by the impedance of the delay circuit and the impedance between the control terminals of the first switching element Q1. Since the fly-back voltage is reduced, the voltage applied across the control terminals of the first switching element Q1 does not reach the threshold value. Thus, the first switching element Q1 is not turned on by the first drive-winding T3, and thus, the oscillation is stopped. Thereafter, the first switching element Q1 is turned on by the starting resistor to start, and then, is stopped. As described above, the device is operated in an oscillation mode in which the starting and the stopping are repeated. Since the starting-period is sufficiently long compared to the period taken for one cycle when continuous oscillation is carried out, the output power can be sufficiently reduced, and the output current can be significantly reduced.

Preferably, the third switching device is connected in parallel to the impedance circuit, and turns on the second switching device when the peak current becomes a predetermined peak current and subsequently turns on the third switching device to reduce the impedance of the impedance circuit, whereby the first switching element Q1 is turned off.

When the peak current becomes a predetermined peak current, the second switching device is turned on, the third switching device is turned on, the first switching device is turned on, and then the first switching device is turned off. At this time, the third switching device is driven by an electrical signal supplied when the second switching device is turned on. Accordingly, the time at which the third switching device is turned on becomes earlier. Thus, the first switching element Q1 can be rapidly turned off. Moreover, the operation of the on-period limiting circuit and that of the peak current limiting circuit can be changed continuously without skipping.

Preferably, the peak current limiting circuit inputs a voltage developed in the first drive winding T3 during the on-period of the first switching element via a resistor and a diode, the voltage being substantially proportional to the input voltage of the device.

Preferably, the peak current limiting circuit inputs the sum of a first electrical signal which increases with increases in the current flowing through the first switching element Q1 and a second electrical signal which increases with the output voltage of the device being reduced to the control terminal of the second switching device and reduces the on-period of the first switching element Q1 with increases in the input electrical signal.

When the input voltage is varied, the higher the input voltage is, the higher the overcurrent point becomes. Thus, by inputting the voltage that is developed in the first drive winding and proportional to the input voltage to the control terminal of the third switching device via the resistor and the diode, the overcurrent point can be made low only when the input voltage is high, such that the variations of the overcurrent point caused by that of the input can be minimized. In particular, when the input voltage is high, the third switching device is turned on earlier. This reduces the size and weight of the switching power source device.

Preferably, the peak current limiting circuit inputs the sum of a first electrical signal which increases with increases in the current flowing through the first switching element Q1 and a second electrical signal which increases with the output voltage of the device being reduced to the control terminal of the second switching device, and reduces the on-period of the first switching element Q1 with increases in the input electrical signal.

When the output voltage is reduced, the sum of the electrical signals input to the control terminal of the second switching device is increased. Therefore, the on-period of the first switching element Q1 is further reduced, and the output power is decreased. Thus, the output current can be reduced.

Preferably, the second electrical signal is formed in such a manner that the fly back voltage developed in the first drive-winding T3 during the off-period of the first switching element Q1 is rectified-smoothed by a diode and a capacitor. The negative potential of the capacitor and the positive potential of the first drive-winding T3 are divided by a resistor or a combination of a resistor and a Zener diode, and the divided voltage is input to the control terminal of the second switching device via the diode.

By setting the Zener diode and the voltage-dividing resistor at predetermined values according to the above-described configuration, the overcurrent characteristic curve representing the change of the output voltage with respect to the output current can have a desired shape. In particular, by setting the output voltage which is caused to be reduced by the overcurrent, to the value at which the second signal starts to increase, the second electrical signal quantity is adjusted. When the increment of the second signal with respect to one variation of the output voltage is increased, the output power is decreased as the output voltage is reduced. That is, the characteristic curve has a "returning and decreasing shape". When the increment of the second electrical signal is decreased, the characteristic curve has a "slightly convex shape". That is, although the output voltage is reduced, the output power is kept substantially constant. When the over-current characteristic curve is set so as to have an intermediate shape between the above-described characteristic curves, a "vertically-changing characteristic" can be obtained in which the output current is not changed although the output voltage is reduced.

Preferably, the switching control circuit includes a second on-period control circuit which controls operation so as to turn on a fourth switching device connected to the control terminal of the second switching element Q2 to turn off the second switching element Q2 a predetermined period after the second switching element Q2 is turned on by the voltage developed in the second drive winding T4, the predetermined period being determined by a time constant circuit.

In particular, the control circuit for turning off the second switching element Q2 is preferably defined in the two-transistor self-excitation oscillation switching power source device described above. Since the turn-off timing of the second switching element Q2 is determined by the time constant circuit, the on-period of the second switching element Q2 can be controlled by this simple configuration which does not require the use of an IC or other elements required in conventional devices.

Preferably, the fourth switching device includes a transistor, and the time constant circuit includes an impedance circuit and a capacitor to be charged and discharged which are connected to the control terminal of the transistor.

Accordingly, the on-period of the second switching element Q2 can be controlled by the simple configuration using a small number of parts.

Preferably, the energy stored in the primary winding T1 during the on-period of the first switching element Q1 is released from the secondary winding T2 during the off-period to produce an output.

Preferably, the fly-back type switching power source device has the unique configuration as described above.

Preferably, the time constant of the second on-period control circuit is set so that the first switching element Q1 is turned off before the energy stored in the primary winding T1 during the on-period of the first switching element Q1 is completely released from the secondary winding T2 during the off-period, whereby the device is operated in a current continuous mode in which the current flowing through the first switching element Q1 has a trapezoidal waveform.

In particular, the second on-period control circuit forcedly interrupts the resonance current flowing through the series circuit including the second switching element Q2 and the inductor L, after the second switching element Q2 is turned on and before the energy release from the second winding is completed. That is, the second on-period control circuit is set so as to have a predetermined time constant at which the above-described operation can be carried out.

According to the above-described on-period control circuit, the second switching element Q2 is turned off to interrupt the current flowing through the inductor L before the energy release from the second winding is completed. This change in the current causes the voltage of the first winding to be inverted. Thus, a voltage is developed in the first drive-winding T3, so that the first switching element Q1 is turned on. Thereby, the device carries out a self-excitation oscillation operation, and is operated in a continuous operation mode in which the current flows in the secondary winding T2 of the transformer T, and without a stopping-period, the current flows in the primary winding. Hence, the current flowing through the first switching element Q1 at loading can be given a trapezoidal waveform. That is, the device is operated in the continuous current mode in which the waveform of the current flowing through the first switching element Q1 at heavy loading is a trapezoid. Hence, the peak value of the current flowing through the transformer T and the first switching element Q1 and the effective current can be greatly reduced. Further, the copper loss of the transformer and the conduction loss of the first switching element Q1 can be significantly reduced. Thus, the size and weight of the switching power source device can be reduced, and a high efficiency can be attained.

Preferably, the switching control circuit sets the impedances at charging and discharging of the charge-discharging capacitor of the second on-time control circuit so that the on-period of the second switching element Q2 is increased with the output voltage being reduced, whereby the first switching element Q1 is turned on after the energy stored in the primary winding T1 is released form the secondary winding T2 during the off-period, and is self-excitation-oscillated. The current flowing through the first switching element Q1 has a triangular waveform.

The peak current limiting circuit also can be applied in the case in which the current waveform is not trapezoidal but triangular. When the current waveform is triangular, the off-period is determined by the energy release period. Therefore, the switching frequency is reduced with the output voltage being decreased from the time at which the peak current limiting circuit starts to operate. When the switching frequency is reduced as described above, the output power is not increased but decreased in contrast to the case in which the switching frequency is increased. Thus, the output current is prevented from increasing. The switching loss can be reduced by turning off the first switching element Q1 more rapidly. Thus, the on-period can be reduced appropriately.

Preferably, at least one of the first and second switching elements includes a field effect transistor.

Accordingly, the parasitic capacity of the field effect transistor can be used as the capacitor C1 or the capacitor C2. Moreover, the parasitic diode of the field effect transistor can be used as the diode D1 of the diode D2. Thus, the number of parts of the device can be reduced. That is, the cost of the switching power source device can be reduced, and the size and weight thereof can be decreased.

Preferably, the inductor L includes a leakage inductor included in the transformer T.

Preferably, the leakage inductor of the transformer T is used as the inductor L. Thus, the number of components can be reduced. The cost of the switching power source device can be reduced, and the size and weight thereof can be decreased.

The advantages of various preferred embodiments of the present invention are summarized as follows.

When the peak value of the current flowing through the first winding reaches a predetermined value, the second switching device is turned on, and then the third switching device is turned on, and thereby the electrical signal can be increased in quantity. Accordingly, the first switching element Q1 can be turned on rapidly. The switching loss at turning off can be reduced, and increasing of the output current can be prevented.

The peak value of the current flowing through the first winding can be limited to a predetermined value, due to the peak current limiting circuit. Thus, magnetic saturation of the transformer can be prevented, and the high reliability of the switching power source device can be attained.

With the output voltage being reduced, the output power can be reduced, and the output current can be decreased, due to the on-period limiting circuit shortening the maximum on-period.

The device is operated in the mode in which starting and oscillation-stopping are repeated by appropriately setting the impedance of the turn-on delay circuit. Thus, the output power can be considerably reduced, and the shortcircuit current can be decreased. On the other hand, according to the examples 1 and 2, the output voltage current characteristic shown in FIG. 18 is obtained. The operation cannot be transitioned to the starting and stopping oscillation mode. The secondary current is increased at shortcircuiting. Thus, the rectification diode may be broken.

In the overcurrent protection circuit including the on-period limiting circuit for limiting the on-time using the time constant circuit, and the peak-current limiting circuit for limiting the peak current flowing through the first switching element Q1, the transistor Tr1 as the first switching device can also be used as the turn-off control of the first switching element Q1. Therefore, the number of components can be reduced. Moreover, the operation of the peak current limiting circuit and the operation by the on-period control circuit can be continuously switched over. The operation of the device can be stabilized. Furthermore, the transistors Tr2 and Tr3 may have a smaller current capacity compared to that of the transistor Tr1. Thus, rising costs can be avoided.

Even when the input voltage is changed, the output current (overcurrent point), at which the limitation of the peak current starts, can be kept constant. Therefore, magnetic saturation of the transformer can be reduced, and the size thereof can be decreased.

Other features, elements, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
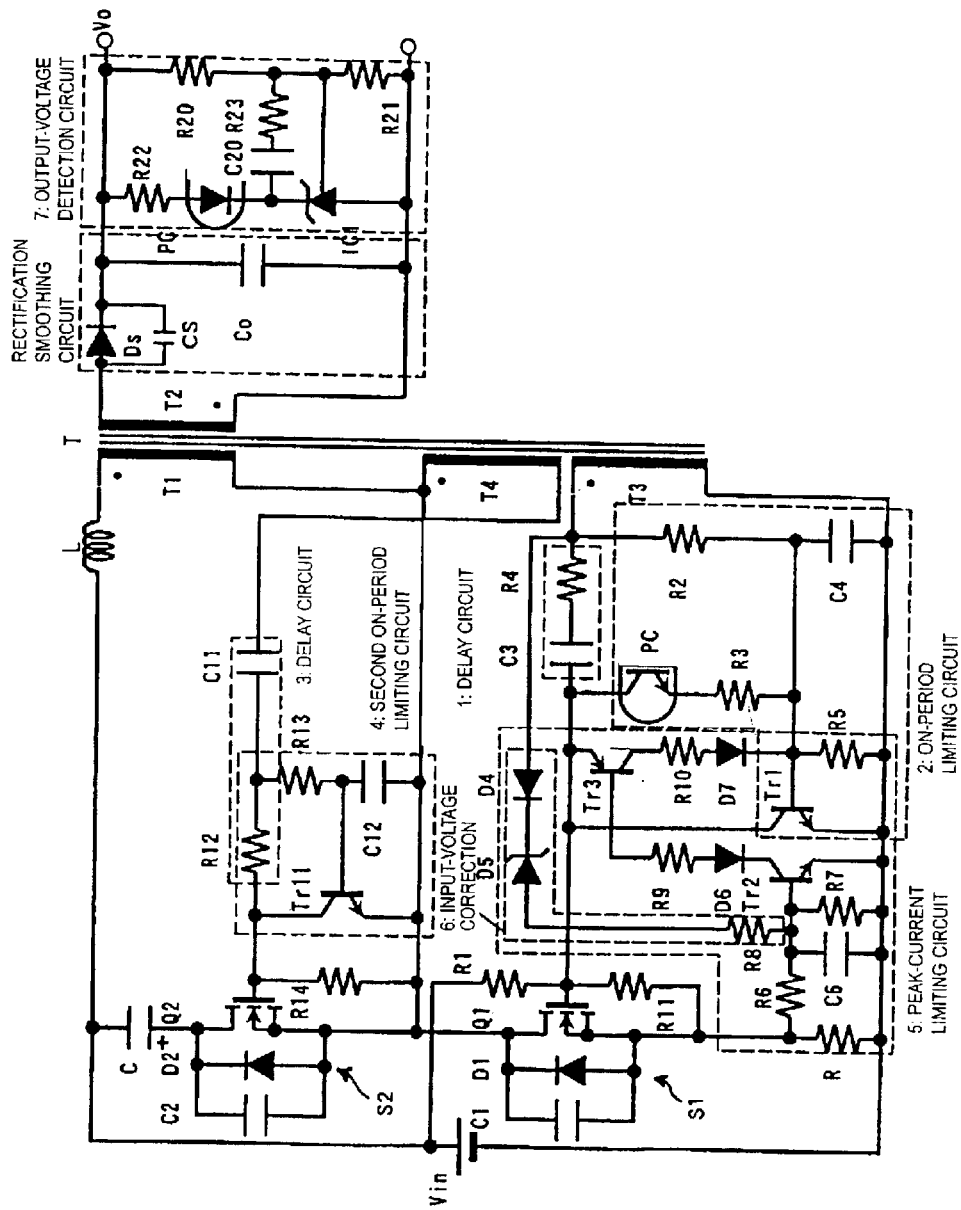
FIG. 1 is a circuit diagram of a switching power source device according to a first preferred embodiment of the present invention.

FIG. 1 is a circuit diagram of a switching power source device according to a preferred embodiment of the present invention.

A first switching circuit S1 and an input power source Vin are connected in series with a series circuit including a primary winding T1 and an inductor L. A series circuit including a second switching circuit S2 and a capacitor C is also connected in parallel to the series circuit including the primary winding T1 and the inductor L. A rectification-smoothing circuit including a rectification element Ds is connected to a secondary winding T2 of the transformer T.

The first switching circuit S1 includes a parallel connection circuit including a first switching element Q1, a first diode D1, and a first capacitor C1 connected in parallel to each other. The second switching circuit S2 includes a second switching element Q2, a second diode D2, and a second capacitor C2 connected in parallel to each other.

The transformer T is provided with a first drive winding T3 and a second drive winding T4. A first switching control circuit is connected between the first drive winding T3 and the control terminal of the first switching element Q1. A second switching control circuit is provided between the second drive winding T4 and the control terminal of the second switching element Q2. The first and second switching control circuits constitute a switching control circuit according to preferred embodiments of the present invention. The first and second switching control circuits control the switching elements Q1 and Q2 in such a manner that these elements are alternately turned on/off while a period when both elements are turned off is interposed between the on/off operations, causing energy to be stored in the primary winding T1 and the inductor L during the on-period of the first switching element Q1, and the energy to be released from the secondary winding T2 during the off-period of the first switching element Q1. Thus, the first and second switching elements Q1 and Q2 are self-excitation oscillated.

The first switching control circuit includes a delay circuit 1 and an on-period control circuit 2. The on-period control circuit 2 constitutes a portion of an overcurrent protection circuit as described below.

The delay circuit 1 includes a series circuit including a resistor R4 and a capacitor C3, and delays a voltage developed in the first drive winding T3 and applies the voltage to the control terminal of the first switching element Q1. The delay time-period of the delay circuit 1 is set to be a period from the time when the voltage is developed in the first drive winding T3 to the time when the electric charge of the capacitor C1 applied to both ends of the first switching element Q1 in the off-state, is reduced to zero or nearly zero voltage. Thereby, the first switching element Q1 is turned on after the voltage applied to both ends thereof is reduced to zero or nearly zero.

The on-period control circuit 2 includes a transistor Tr1 as a first switching device connected between the control terminal of the first switching element Q1 and the reference potential terminal (negative electrode) of the input power supply source Vin; a series circuit including a resistor R2, a resistor R3, a phototransistor of a photocoupler PC connected to the control terminal of the transistor TR1; and a time constant circuit including a capacitor C4. The transistor Tr1 is connected to the control terminal of the first switching element Q1. The series circuit including the resistor R2 and the capacitor C4 is connected to the first drive winding T3. When overcurrent flows, the capacitor C4 is charged, due to the current flowing through the resistor R2. The transistor Tr1 is turned on a predetermined time after a voltage is developed in the first drive winding T3. The series circuit including the above-described phototransistor and the resistor R3 controls the on-period of the transistor Tr1 based on a signal from an output voltage detection circuit, which is described below, to stabilize the output voltage Vo.

The second switching control circuit includes a delay circuit 3 and a second on-period control circuit 4.

The delay circuit 3 delays a voltage developed in the second drive winding T4 and applies this voltage to the control terminal of the second switching element Q2. The delay period of the delay circuit 3 is set at a period from the time when the voltage is developed in the second drive winding T4 to the time when the voltage applied to both ends of the second switching element Q2 is reduced to zero or nearly to zero, similarly to the delay circuit 1. Thereby, the second switching element Q2 carries out the zero-voltage switching. The second on-period control circuit 4 includes a transistor Tr11 as a fourth switching device connected to the control terminal of the second switching element Q2, and a time constant circuit including a resistor R13 and a capacitor C12 connected to the control terminal of the transistor Tr11. The time constant circuit, including the resistor R13 and the capacitor C12, causes the transistor Tr11 to turn on at a predetermined time-period after a voltage is developed in the second drive winding T4, so that the second switching element Q2 is turned off. Moreover, the time constant of the time constant circuit including the resistor R13 and the capacitor C12 connected in series is set as follows: the time constant circuit forcedly interrupts the current flowing through the series circuit including the second switching element Q2 and the inductor L to cause the second switching element Q2 to turn off after a voltage is developed in the second drive winding T4 and before the energy release from the second winding T2 is completed, as described above so that the second switching element Q2 is turned on. Thus, subsequently from the time at which the second switching element Q2 is turned off, the first switching element Q1 can be turned on. Thus, the waveform of the current Id flowing through the first switching element Q1 is trapezoidal.

A peak-current limiting circuit 5 including a resistor R, which is a way of detecting a current Id1 flowing through the switching element Q1, is connected to the first switching element Q1. The peak-current limiting circuit 5 includes the resistor R for detecting the current Id1, a transistor Tr2 which is a second switching device and to which a voltage applied to both ends of the resistor R is input to the base terminal of the transistor Tr2 via a resistor R6, a transistor TR3 which is a third switching device and to which the collector current of the transistor Tr2 is supplied as the base current, and a transistor Tr1 which is a first switching device and to which the collector current of the transistor Tr3 is supplied as the base current.

In the peak-current limiting circuit 5, the resistor R6 and a resistor R7 divide the voltage corresponding to the current Id1 flowing through the resistor R, and the divided voltage is supplied between the base-emitter of the transistor Tr2. When the voltage exceeds a threshold value Vbe (for example, about 0.6 V), the transistor Tr2 is turned on, and further, the transistor TR1 is turned on and the first switching element Q1 is turned off. Thereby, the peak value Idp of the current flowing through the primary winding T1 and the first switching element Q1 can be controlled to be a predetermined value. Thus, magnetic saturation of the transformer, which may be caused by an overcurrent, can be prevented.

The base current Ib required to turn on the transistor Tr2 is expressed by the following equation:

$$Ib = Ic/(\alpha 1 \times \alpha 2 \times \alpha 3) \qquad (1)$$

in which Ic represents the collector current of the transistor Tr1 required to turn on the transistor Tr1 connected between the gate and the source of FET Q1 which is the first switching element Q1, causing the voltage to be discharged so that the FET Q1 is turned on and $\alpha 1$, $\alpha 2$ and $\alpha 3$ represent the amplification factors of the transistors Tr1, Tr2, and TR3, respectively. Leakage current is neglected.

Figure 14:
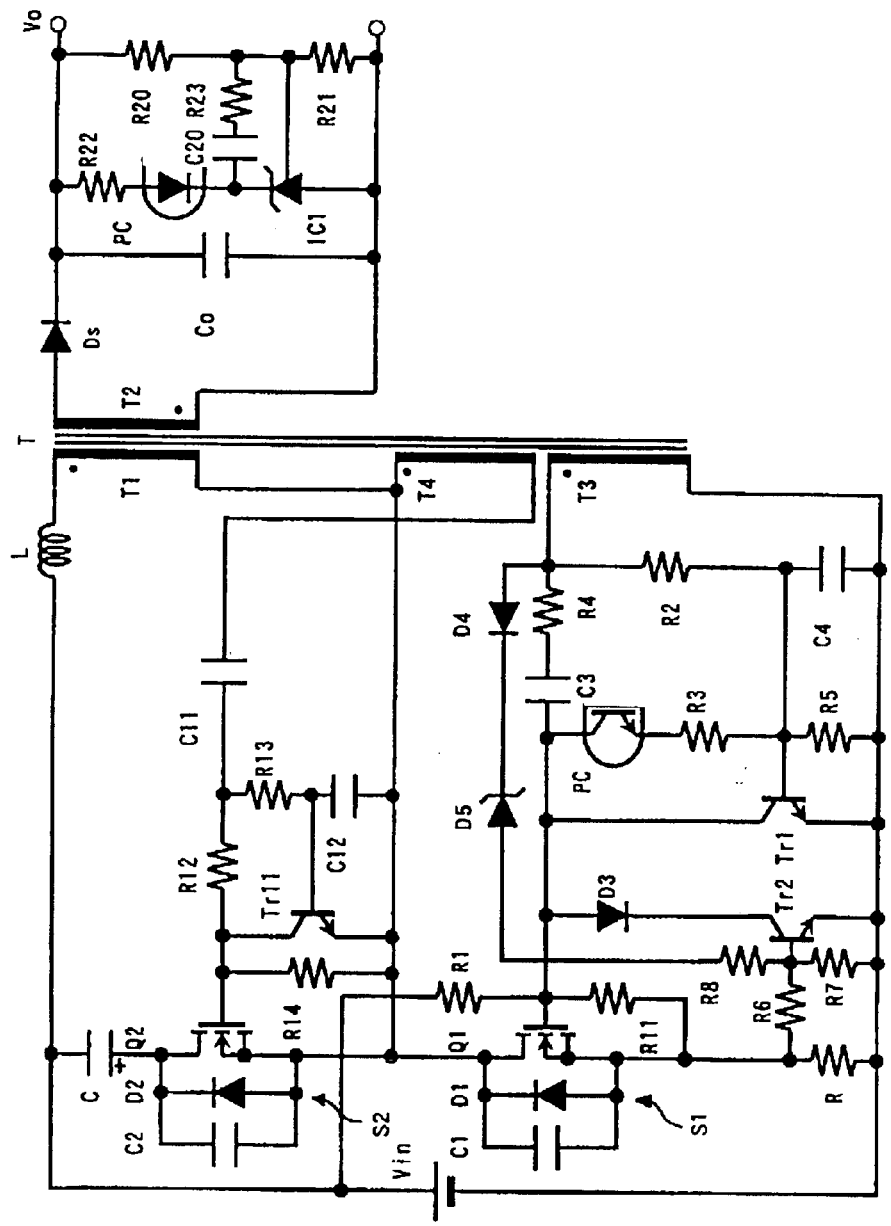
FIG. 14 is a circuit diagram of a switching power source device of the example 1.
Figure 15:
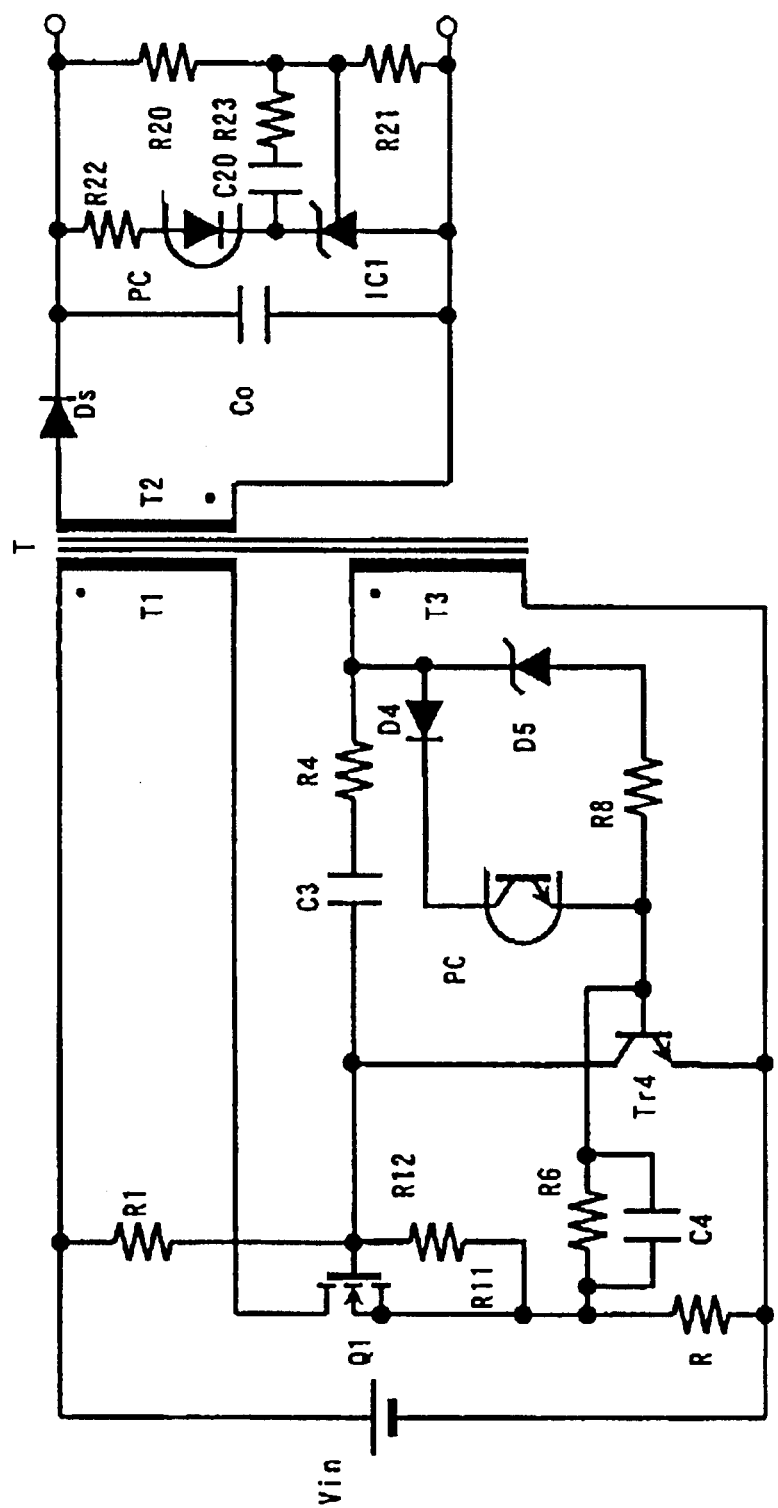
FIG. 15 is a circuit diagram of a switching power source device of the example 2.
Figure 16:
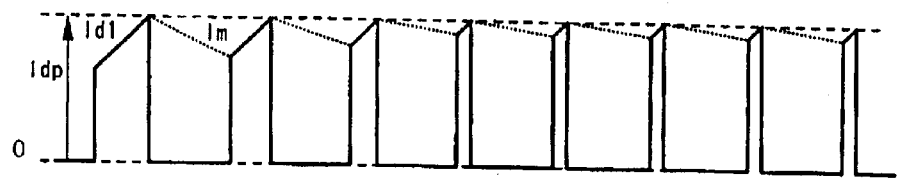
FIG. 16 is a waveform chart of current Id1 when the output voltage is reduced in the example 1.
Figure 17:
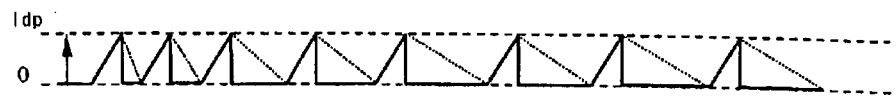
FIG. 17 is a waveform chart of current Id1 when the output voltage is reduced in the example 2.
Figure 18:
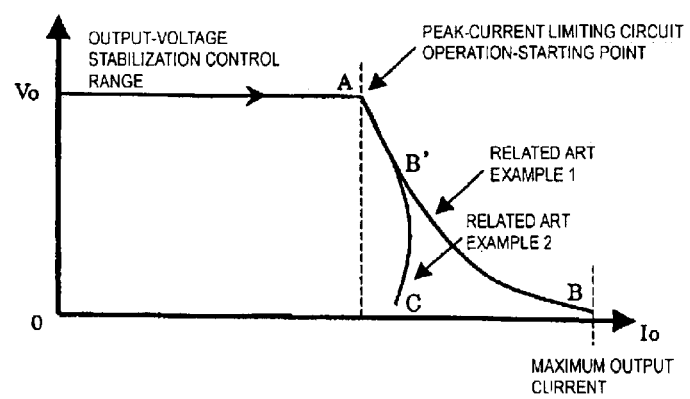
FIG. 18 shows the output voltage current characteristic curves of the examples 1 and 2.

On the other hand, according to the circuit shown in FIG. 14, the base current Ib is expressed by the following equation:

$$Ib=Ic/\alpha 2 \qquad \text{equation (2)}$$

The equations (1) and (2) are compared. In the case of the equation (1), the transistor Tr1 can be turned on with a smaller base current Ib so that the FET Q1 is turned off. Therefore, the delay period from the time when the peak current is detected and the base-emitter voltage of the transistor Tr2 reaches the threshold value to the time at which the FET Q1 is turned off is short. Thus, the FET Q1 can be rapidly turned off.

When an overcurrent is caused, the on-period limiting circuit 2, including the time constant circuit having the resistor R2 and the capacitor C4, also carries out protection from the overcurrent. When the output current Io from the secondary winding T2 is increased so that the peak value of the current flowing through the first switching element Q1 exceeds a predetermined value, the peak-current limiting circuit 5 operates so that the current peak value is limited. When the output current Io is further increased, the peak-current limiting circuit 5 operates so as to reduce the output voltage while the output power is kept constant. At this time, with reduction of the output voltage, the time constant circuit of the on-period limiting circuit 2 makes the on timing of the transistor TRI earlier, so that the maximum on-period of the first switching element Q1 becomes short.

When the output voltage is further decreased, the fly-back voltage developed in the first drive winding T3 is reduced. The fly-back voltage is divided by the impedance of the delay circuit and the impedance between the control terminals of the first switching element Q1. The voltage between the control terminals of the first switching element Q1 becomes less than the threshold value, the first switching element Q1 is not turned on by the first drive-winding T3, and the oscillation is stopped. Thereafter, a starting resistor causes the first switching element Q1 to turn on again, so that the device starts the operation and then stops. As described above, the device is operated in the oscillation mode in which the starting and the stopping are repeated. Since the starting-period is sufficiently long compared to the period (taken for one cycle) obtained when continuous oscillation is carried out, the output power can be sufficiently decreased. Thus, the shortcircuit current can be satisfactorily reduced when the output is shortcircuited.

Accordingly, when an overcurrent flows, firstly, the current peak value is limited by the peak-current limiting circuit 5, and the output power is limited, so that magnetic saturation of the transformer is prevented. Secondly, the maximum on-period of the first switching element Q1 is reduced by the on-period limiting circuit 2, so that the output power is reduced, and the output current is prevented from increasing. Thirdly, the turn-on delay circuit provides the operation mode in which the starting and the stopping are repeated and significantly reduces the output power, and thus, the short-circuit current can be reduced.

Furthermore, an input voltage correction circuit 6 for overcurrent-protection is connected to the peak-current limiting circuit 5. According to preferred embodiments of the present invention, the input correction circuit 6 defines a portion of the overcurrent-protection circuit. The input correction circuit 6 is connected between the first drive winding T3 and the base terminal of the transistor Tr2 of the peak-current limiting circuit 5, and includes a series circuit including a diode D4, a Zener diode D5, and a resistor R8 connected in series. This circuit is provided to correct the output current at which the peak-current limiting circuit 5 operates when the input voltage is changed. In particular, when the input voltage is high, the voltage developed in the first drive-winding T3 is increased. Hence, the operation point of the overcurrent protection circuit is lowered by supplying a current to the base terminal of the transistor Tr2 via the correction circuit 6. In this way, the operation point of the overcurrent protection circuit can be kept substantially constant to compensate for variation of the input voltage.

An output-voltage detection circuit 7 for detecting an output voltage Vo is provided on the output side of the secondary winding T2 of the transformer T.

The output-voltage detection circuit 7 includes voltage-dividing resistors R20 and R21 for dividing the output voltage Vo, a shunt regulator IC1 of which the input terminal for a reference voltage Vr is connected to the node (reference point) between the resistors R20 and R21, and a photodiode for a photocoupler PC connected in series with the shunt regulator IC1. The shunt regulator IC 1 compares a reference voltage Vr and the voltage Va divided by the voltage-diving resistors R20 and R21 to each other, and controls the current between the cathode and the anode thereof, depending on the difference between the voltages Vr and Va. A change in the current is converted to the intensity of light. In particular, when the output voltage Vo is increased, the collector-emitter impedance of the phototransistor of the on-period control circuit 2 is reduced, and thereby, the charging-time of the capacitor C4 during the on-period of the first switching element Q1 becomes earlier. Thus, the transistor Tr1 is turned on earlier, so that the turn-off timing of the first switching element Q1 becomes earlier, and the on-period becomes short. When the on-period of the first switching element Q1 becomes short, the output-current is decreased, and the output-voltage Vo is reduced. When the output voltage becomes lower than a predetermined voltage (set voltage), the output power is increased, and the output voltage is increased according to the operation that is opposite to that described above. Thus, the output voltage is controlled for stabilization. The output voltage Vo in this case is expressed by the following equation:

$$Vo=Vr\times (R20+R21)/R21 \qquad (3)$$

Hereinafter, operation of the above-described switching power source device connected to a rated load will be described.

Figure 2:
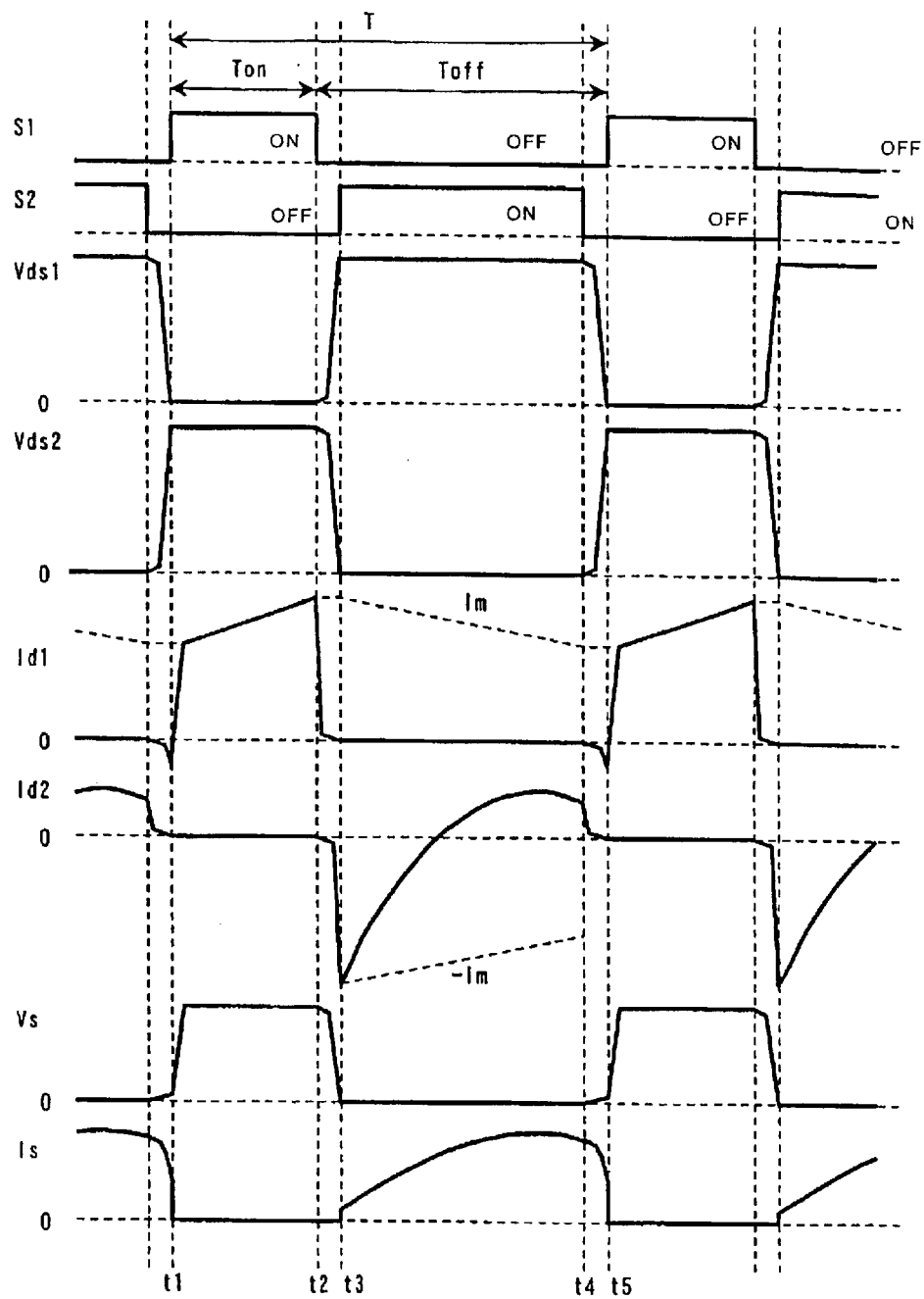
FIG. 2 is an operation waveform chart of the device of FIG. 1 connected to a rated load.

FIG. 2 is a waveform chart of the circuit shown in FIG. 1, having these ratings. The operation of the circuit will be described in detail with reference to FIGS. 1 and 2.

Referring to FIG. 2, S1 and S2 represent signals in the on/off states of the first and second switching elements Q1 and Q2, respectively. Vds1, Vds2, and Vs represent waveforms of voltages applied across both ends of the respective capacitors C1, C2, and Cs. Id1, Id2, and Is designate the waveforms of currents flowing through the switching circuits S1 and S2, and the rectification element Ds, respectively.

The switching operation of this circuit under the optimum stationary conditions can be divided into four operation states based on times T1 to t5 in one switching period T. Hereinafter, the operation of the circuit in the respective states will be described.

(State 1) t1 to t2

The first switching element Q1 is on. An input voltage is supplied to the primary winding T1 of the transformer T, so that the current flowing through the primary winding is increased linearly. At this time, the excited energy is stored in the transformer T. Moreover, at this time, the capacitor C4 is charged via the photocoupler PC. When the voltage of the capacitor C4 reaches the threshold voltage (for example, about 0.6 V) of the transistor Tr1 is turned on, and the first switching element Q1 is turned off at the time t2 to be transited into the state 2.

(State 2) t2 to t3

When the first switching element Q1 is turned off, the primary winding T1 of the transformer and the inductor L resonate with the capacitors C1 and C2. Thus, the capacitor C1 is charged, and the capacitor C2 is discharged. In the secondary, the secondary winding T2 of the transformer T and the capacitor Cs resonate with each other. Thus, the capacitor Cs is discharged. The curves showing the leading and trailing edges of the voltage Vds1 are composed of parts of the sinusoidal wave obtained by the resonance of the primary winding T1 and the inductor L with the capacitors C1 and C2, respectively. When the both-end voltage Vds2 of the capacitor C2 is decreased to zero, the diode D2 conducts. Thus, the circuit is transitioned into the state 3.

At this time, in the circuit attached to the secondary winding of the transformer, the both-end voltage Vs of the capacitor Cs is decreased to zero, and the rectification element Ds conducts. Thus, the zero-voltage turn-on operation is carried out. The curve showing the trailing edge of the both-end voltage Vs is composed of a part of the sinusoidal wave obtained by the resonance of the capacitor Cs with the secondary winding T2.

(State 3) t3 to t4

In the state in which the diode D2 conducts, the voltage developed in the second drive winding T4 is delayed by the delay circuit 3 including a capacitor C11 and a resistor R11, and is supplied to the control terminal of the second switching element Q2, so that the second switching element Q2 is turned on. Thus, the second switching element Q2 carries out the zero-voltage switching operation. In the state 3, in the primary, the diode D2 and the second switching element Q2 conduct, the inductor L and the capacitor C start to resonate, and the capacitor C is discharged.

At this time, in the circuit attached to the secondary winding of the transformer, the rectification element Ds conducts, and the excited energy stored in the transformer T is released from the secondary winding T2, and is output via the rectification-smoothing circuit. In this state, the current Is flowing through the rectification element Ds has a waveform that is similar to the waveform of the resonance current Id2 flowing through the inductor L and the capacitor C in the primary added to the waveform of the excitation current Im, which decreases linearly. Therefore, the current Is rises from the zero value relatively rapidly, and has a waveform including a sinusoidal curve.

In the circuit attached to the primary winding of the transformer, the capacitor C12 is charged via the resistor R12, by the voltage developed in the second drive winding T4. When the charge voltage reaches the threshold voltage (for example, about 0.6 V) of the transistor Tr2, the transistor Tr2 is turned on and forcedly interrupts the resonance current flowing through the second switching element Q2. At this time, the above-described interrupted resonance current is at about its peak value, at time t4. For the time constant circuit including the resistor R12 and the capacitor C12 included in the second on-period control circuit 4, the time constant is set at the value at which the second switching element Q2 is turned off at the time t4.

(State 4) t4 to t5

When the second switching element Q2 is turned off, the resonance current Id2 is interrupted rapidly. This rapid current-change causes a voltage to be developed in the inductor L, so that the voltage of the primary winding T1 of the transformer T is inverted. The inductor L resonates with the capacitors C1 and C2. The capacitor C1 is discharged, and the capacitor C2 is charged, due to the excitation energy of the inductor L. The both-end voltage Vds1 of the capacitor C1 is reduced and becomes zero at the time t5, so that the diode D1 conducts. Thus, the state 4 is completed. In the state in which the diode D1 conducts, the voltage developed in the first drive-winding T3 is delayed by the delay circuit 1 including the resistor R4 and the capacitor C3, and is supplied to the control terminal of the first switching element Q1. Thereby, the first switching element Q1 is turned on. Thus, the zero voltage switching operation is carried out.

In the circuit attached to the secondary winding of the transformer, when the second switching element Q2 is turned off, the rectification element Ds turns off. The both-end voltage Vs of the capacitor CS is increased from the zero voltage, and is clamped to the sum of the secondary winding voltage and the output-voltage.

Thus, the above-described operation is carried out per one switching-period. This operation is repeated.

Operation of the Overcurrent Protection Circuit

Hereinafter, the operation of the overcurrent protection circuit and the input-voltage correction circuit 6, which is carried out when an overcurrent flows will described with reference to FIG. 3 which shows the output-voltage current characteristic. The overcurrent protection circuit includes the on-period limiting circuit 2, the peak-current limiting circuit 6, and the delay circuit 1.

When the output current is increased so that the peak value of the current flowing through the first switching element Q1 (FET Q1) is increased, the overcurrent protection circuit operates so as to prevent saturation of the transformer. Referring to FIG. 1, the peak value of the current is detected by the resistor R. The both-end voltage of the resistor R is divided by the resistors R6 and R7. The divided voltage is applied between the base and the emitter of the transistor Tr2. When the base-emitter voltage of the transistor Tr2 exceeds the threshold voltage (for example, about 0.6 V), the transistor Tr2 is turned on, the transistor TR3 is turned on, the base-emitter voltage of the transistor Tr1 reaches the threshold (for example, about 0.6 V), the transistor TR1 is turned on, and the first switching element Q1 is turned off. Accordingly, the peak value of the current flowing through the primary winding T1 is limited, and the output power is limited. Thus, saturation of the transformer is prevented.

Figure 3:
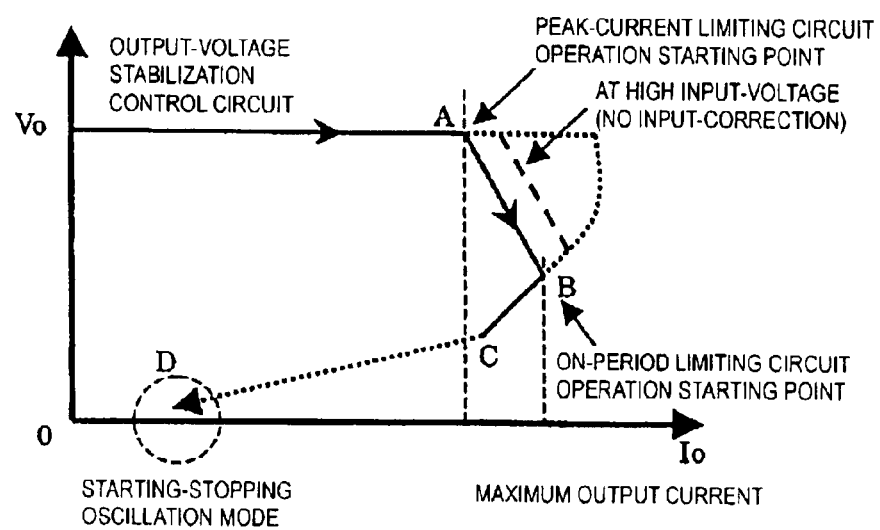
FIG. 3 illustrates the output voltage current characteristic of the device of FIG. 1.
Figure 6:
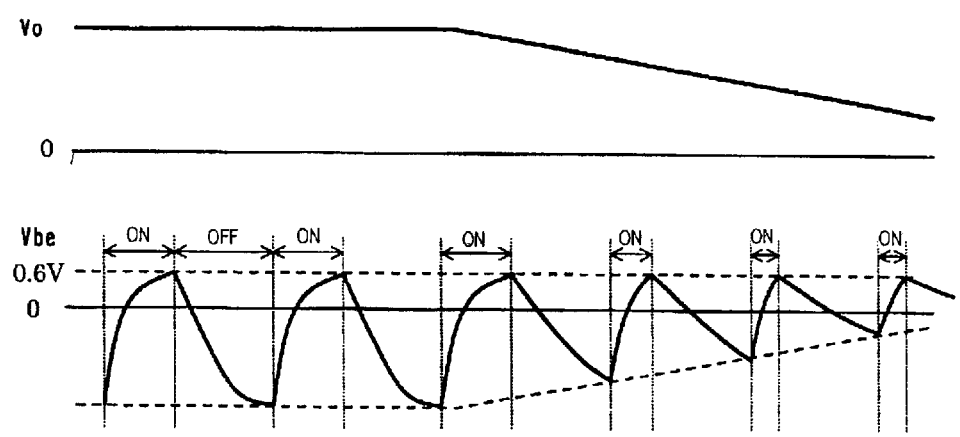
FIG. 6 is a base-emitter voltage of Tr1 when the output voltage is reduced in the device of FIG. 1.

The output voltage is controlled for stabilization in the range from the point 0 to the point A in FIG. 3. The current peak value starts to be limited at the point A. When the output current is further increased, the output power becomes substantially constant, and the output voltage is reduced. In this case, the capacitor C4 is charged via the resistor R2 at the positive voltage which is developed in the first drive-winding T3 and is proportional to the input voltage, and is discharged via the resistor R2 at the negative voltage which is developed in the first drive-winding T3 and is proportional to the output voltage. Therefore, when the output voltage is reduced, the discharge current of the capacitor C4 is decreased, and the maximum on period obtained by the time constant circuit is reduced. FIG. 6 shows the waveform chart of the base-emitter voltage of the transistor Tr1 and the waveform of the output voltage. With reduction of the output voltage, the trailing edge of the base-emitter voltage of the transistor Tr1 on the negative potential side is gradually decreased, and the on-period is reduced.

With reduction of the output voltage, the maximum on-period obtained by the time constant circuit becomes short. The first switching element Q1 is turned off before the peak current flowing through the first switching element Q1 reaches the set value at the point B in FIG. 3. In the range from the point B to the point C, the output power is decreased, and the output current is reduced with the reduction of the output voltage.

The fly-back voltage developed in the first drive-winding T3 is reduced, so that the first switching element Q1 is prevented from turning on at the point C where the maximum on-period obtained by the time constant circuit is reduced. In particular, the fly-back voltage is divided by the impedance of the delay circuit and the impedance between the control terminals of the first switching element Q1. Thus, the fly-back voltage is reduced, and the voltage between the control terminals of the first switching element Q1 becomes less than the threshold voltage. Thus, the first switching element Q1 cannot be turned on by the first drive-winding T3. Thus, the oscillation is stopped. Thereafter, the first switching element Q1 is turned on by the starting resistor to start, and stops again. The oscillation mode in which the starting and the stopping are repeated is carried out as described above. Since the starting-period is sufficiently long compared to the period taken for one cycle at continuous oscillation, the output power can be sufficiently reduced, and the output current can be satisfactorily decreased when an overcurrent flows and the output is shortcircuited. If the starting-stopping oscillation mode is caused while the output voltage and the output current have the values described at the point C in FIG. 3, the values of the output voltage and the output current are rapidly changed to the values described at point D in FIG. 3.

The circuit including the diode D4, the Zener diode D5, and resistor R8 is provided in order to correct the predetermined peak current at which the peak-current limiting circuit 5 operates, when the input voltage is varied. When the input voltage is high, the voltage developed in the first drive-winding T3 becomes high. Thus, the Zener diode D5 conducts, so that current flows via the diode D4, the Zener diode D5, and the resistor R8. Thus, the operation point of the overcurrent protection circuit can be lowered. Thereby, the operation point of the overcurrent protection circuit can be kept substantially constant.

Figure 4:
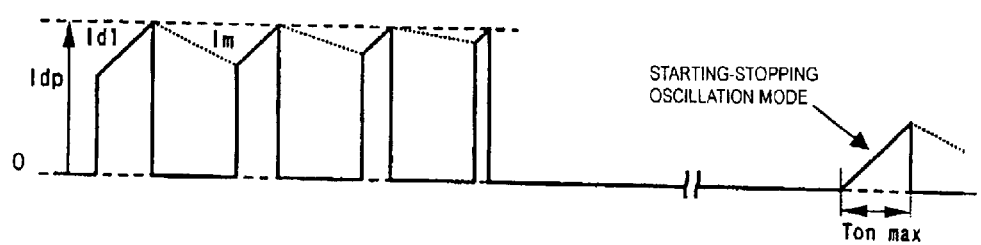
FIG. 4 is a waveform chart of current Id1 when the output voltage is reduced in the device of FIG. 1.

FIG. 4 shows the waveform chart of the current Id1 of which the peak current is limited. According to the circuit of FIG. 1, the off-period of the first switching element Q1 is determined by the on-period of the second switching element Q2 (FET Q2). When the on-period of the second switching element Q2 is substantially constant, the on-period of the first switching element Q1 (FET Q2) is decreased as shown in FIG. 4, while the off-period of the first switching element Q1 is substantially constant With reduction of the output voltage, the switching frequency is increased. With the switching frequency being increased, the output voltage is increased compared with that obtained when the switching frequency is constant. As a result, the output current is increased. For this reason, it is necessary that the delay period from the time at which the peak current flowing through the resistor R reaches a predetermined voltage to the time at which the first switching element Q1 is turned off is decreased as much as possible. Especially, it becomes important that the first switching element Q1 can be rapidly turned off. The operation mode of the circuit of FIG. 1 is transitioned into the starting-stopping oscillation mode by appropriately shortening the on-period. Thus, the output power is considerably reduced.

Figure 5:
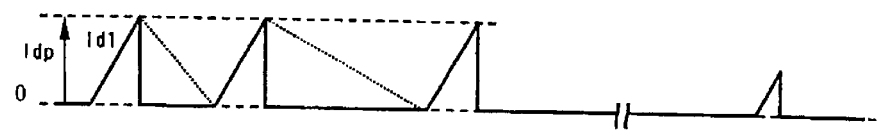
FIG. 5 is a waveform chart of current Id1 when the output voltage is reduced in the device of FIG. 1.

On the other hand, when the waveform of the current Id1 is triangular, the off-period of the first switching element Q1 is determined by the energy release period. A ringing choke converter is one of the circuits which carry out the above-described operation. According to this circuit, the switching frequency is decreased with the output voltage being reduced from the point A in FIG. 3. The operation of the circuit is relatively easily transitioned into the starting-stopping oscillation mode, and the output power can be considerably reduced (see FIG. 5).

Moreover, regarding the circuit of FIG. 1, the on-period of the second switching element Q2 can be set to be longer with the reduction of the output voltage. This becomes possible by setting the impedance at charging of the charge-discharging capacitor of the time constant circuit included in the second on-period control circuit and at discharging thereof to predetermined values. Referring to FIG. 1, the impedance between both ends of the resistor R13 is set so as to have a predetermined value at charging and discharging. In the example of FIG. 1, the charge-discharging capacitor is charged at a voltage which is substantially proportional to the output voltage and is developed in the second drive winding, and is discharged at a voltage which is substantially proportional to the input voltage. Therefore, in the case in which the input-output voltage is not changed, the charging-period of the charge-discharge capacitor is substantially constant. The on-period of the second switching element Q2 is also substantially constant in the stationary state in which the input-output voltage and the load current are not changed, since the charging and the discharging are repeated. However, with the output voltage being reduced, the voltage which is substantially proportional to the output voltage and is developed in the second drive winding is reduced, so that the charging-period becomes long. As a result, the on-timing of the transistor Tr11 which is a fourth switching device becomes late, so that the on-period of the second switching element Q2 becomes long.

The on-period of the second switching element Q2 becomes long, the resonance current flowing through the second switching element Q2 exceeds the peak value, and the second switching element Q2 is turned off at about zero current, and thereby, rapid interruption of the resonance current Id2 is prevented. No rapid change in the current is caused. Thus, no voltage is developed in the inductor L, and the voltage in the primary winding T1 of the transformer T is not inverted. Accordingly, at the timing at which the energy release is completed and the secondary rectification diode becomes non-conductive, the voltage in the primary winding T1 of the transformer T is inverted, the first switching element Q1 is turned on, and the waveform of the current Id1 flowing through the first switching element Q1 becomes triangular. In particular, with reduction of the output voltage, the continuous current mode operation in which the first switching element Q1 is turned on at the timing when the second switching element Q2 is turned off is changed to the current critical mode operation in which the off-period is determined by the energy release period after the second switching element Q2 is turned off. The waveform of the current Id1 becomes triangular. In this case, with the output voltage being reduced, the switching frequency is reduced from the point A in FIG. 3.

Hereinafter, the case in which the switching frequency is increased with the output voltage being reduced, and the case in which the switching frequency is decreased are compared to each other. When the switching frequency is increased, the output power becomes larger even if the on-periods are the same. Thus, it is necessary to considerably reduce the on-period. It is required that the delay-period from the time at which the base-emitter voltage of the transistor Tr2 reaches the threshold to the time at which the first switching element Q1 is turned off is shortened further, and that the first switching element Q1 is rapidly turned off.

In any case, to reduce the switching loss and suppress the output voltage from increasing, it is required to reduce the delay period from the time when the peak current is detected to the time when the first switching element Q1 is turned off and rapidly turn off the first switching element Q1. This problem can be solved by preferred embodiments of the present invention.

Figure 7:
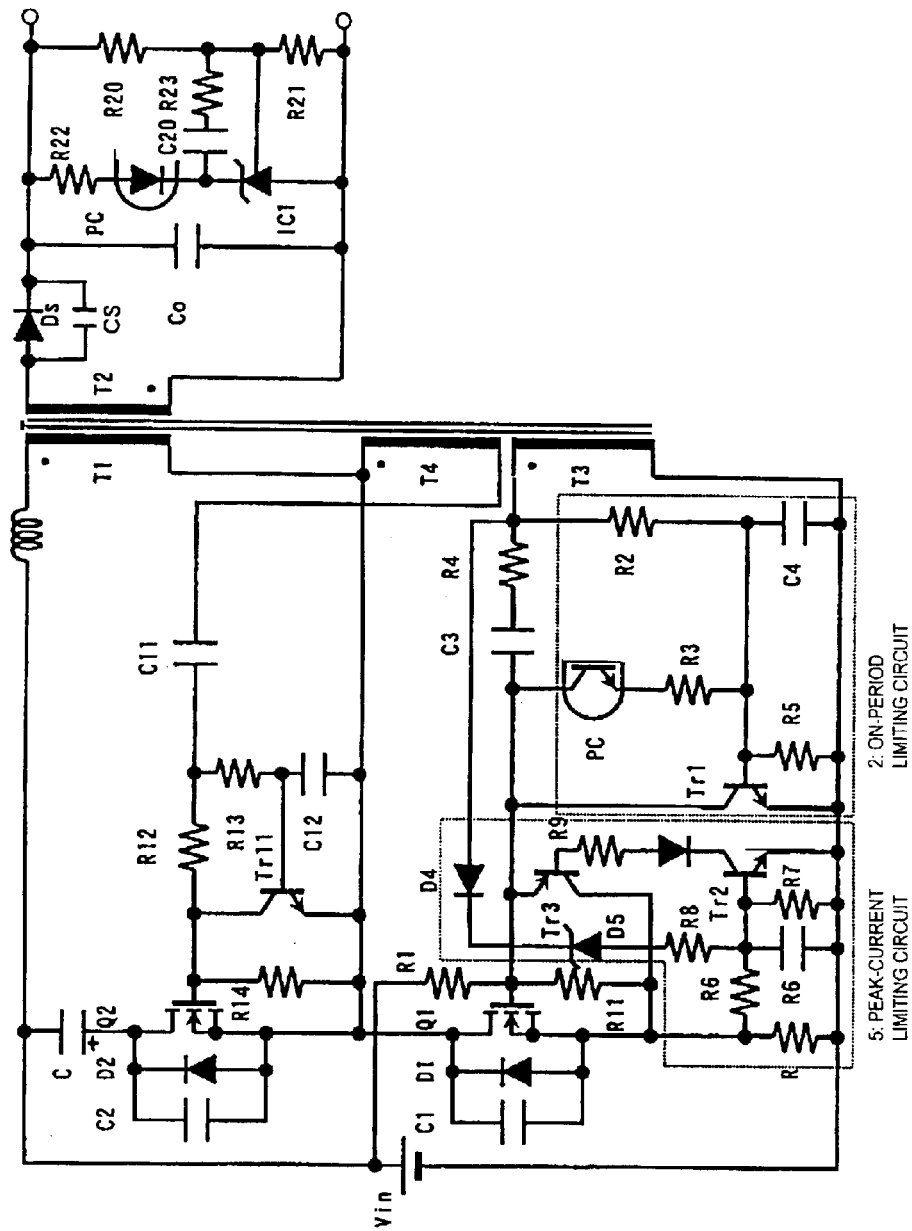
FIG. 7 is a circuit diagram of a switching power source device according to a second preferred embodiment of the present invention.

FIG. 7 is a circuit diagram of a switching power source device according to a second preferred embodiment of the present invention.

In contrast to the first preferred embodiment of the present invention, the collector-emitter of the transistor TR3 is connected between the gate and the source of the first switching element Q1. The peak current of the first switching element Q1 is detected by the resistor R, and is divided by the resistors 6 and 7. When the voltage applied across the resistor R7 exceeds the base-emitter threshold voltage of the transistor Tr2, the transistor Tr2 is turned on, the transistor Tr3 is turned on, and the first switching element Q1 is turned off.

The base current 1b required to turn on the transistor Tr2 is expressed by the following equation:

$$Ib = Ic/(\alpha 2 \times \alpha 3) \tag{4}$$

in which Ic represents the collector current of the transistor Tr1 required when the transistor Tr1 connected between the gate and the source of the first switching element Q1 is turned on so that the voltage is discharged and the first switching element Q1 is turned off, and α2 and α3 represent amplification factors of the transistors Tr2 and TR3, respectively. Leakage current is neglected.

The equation (3) is compared to the equations (1) and (2). As seen in the comparison, the base current Ib of the equation (3) is improved compared to that of the equation (2), and however, needs to be larger than the base current of the equation (1). For this reason, the delay period from the time when the base-emitter voltage of the transistor Tr2 reaches the threshold value to the time when the first switching element Q1 is turned off is longer than that of the circuit according to the first preferred embodiment. However, the delay period is shorter than that of the circuit shown in FIG. 14. Thus, this device of the second preferred embodiment has the same advantages as those of the first preferred embodiment.

Figure 8:
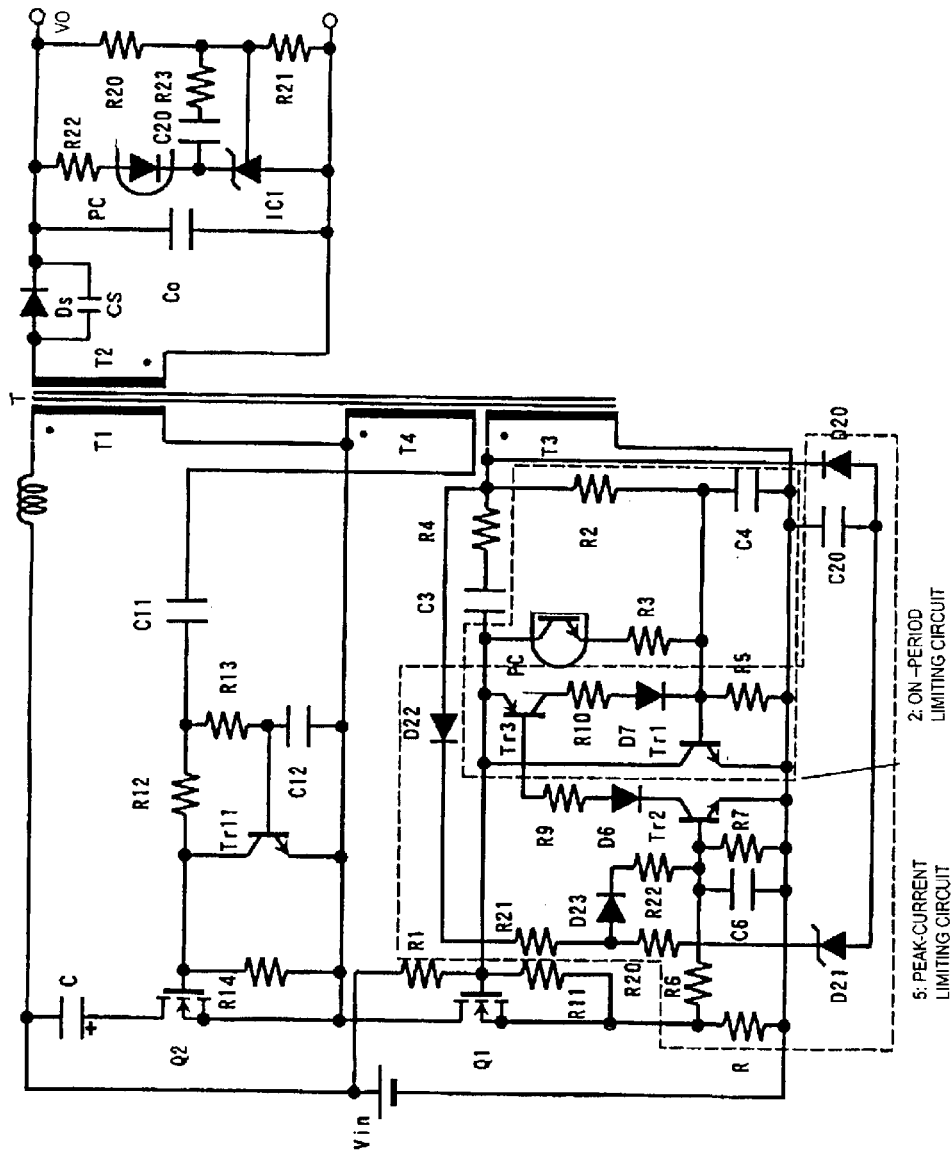
FIG. 8 is a circuit diagram of a switching power source device according to a third preferred embodiment of the present invention.

FIG. 8 is a circuit diagram of a switching power source device according to a third preferred embodiment of the present invention. This switching power source device is a two-transistor type self-excitation oscillation switching power source device which is operated in a continuous current mode.

In the configuration of the device according to the third preferred embodiment of the present invention, a fly-back voltage developed in the first drive-winding T3 during the off-period of the first switching element Q1 is rectified-smoothed by a diode D20 and a capacitor C20. The negative potential of the capacitor C20 and the potential of the first drive-winding T3 to which a diode D22 is connected are divided by a resistor 20, a resistor 21, and a Zener diode D21. The divided voltage is input to the base of the transistor Tr2 via a diode 23. When the output voltage is reduced, the divided voltage applied to the anode of the diode 23 is increased, so that the current input to the base of the transistor Tr2 is increased. Thus, the on-period is reduced, and the output power is decreased. Thus, the output current can be reduced.

In this circuit, the on-period can be further decreased compared to the circuit of the first preferred embodiment, and the output power can be reduced by increasing the current input to the base of the transistor Tr2. Thus, the output current can be decreased.

Figure 9:
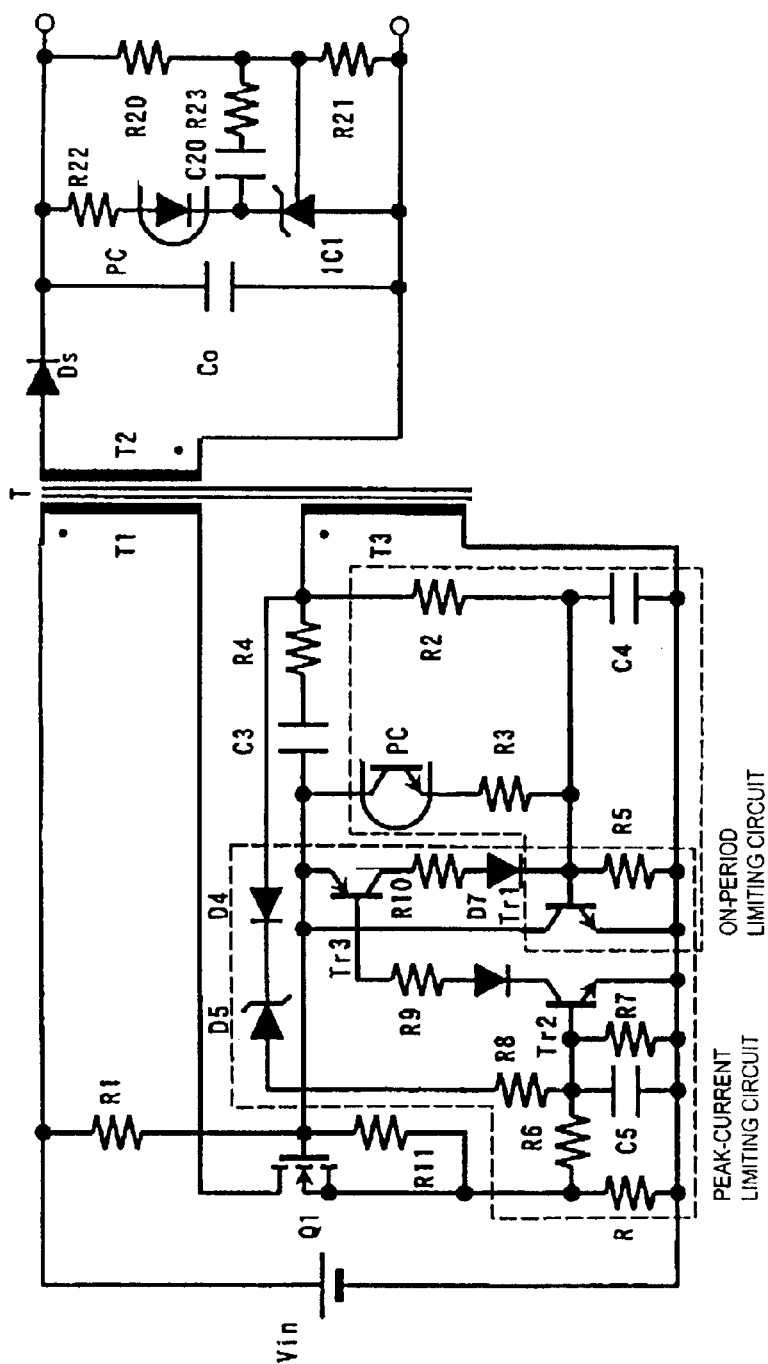
FIG. 9 is a circuit diagram of a switching power source device according to a fourth preferred embodiment of the present invention.

FIG. 9 is a circuit diagram of a switching power source device according to a fourth preferred embodiment of the present invention.

This circuit has the circuit system generally called a ringing choke converter. Energy is stored during the on-period of the first switching device Q1, and is released from the secondary winding during the off-period. The current flowing through the primary winding during the on-period has a triangular waveform. This circuit has the same advantages as those of the first preferred embodiment. This circuit will be compared with that of the first preferred embodiment. The waveform of the current flowing through the first switching element Q1 becomes triangular. With the output voltage being reduced, the on-period is decreased and the off-period is increased. As a whole, the switching frequency is reduced. In the case in which the circuit is operated in the continuous mode according to the first preferred embodiment, the waveform of the current flowing through the first switching element Q1 becomes trapezoid. Thus, even when the output voltage is reduced, the off-period is scarcely changed, and the on-period is reduced, so that the switching frequency is increased. The output is decreased more when the switching frequency is reduced. Therefore, the increasing of the output current is still more suppressed compared to the first preferred embodiment.

Figure 10:
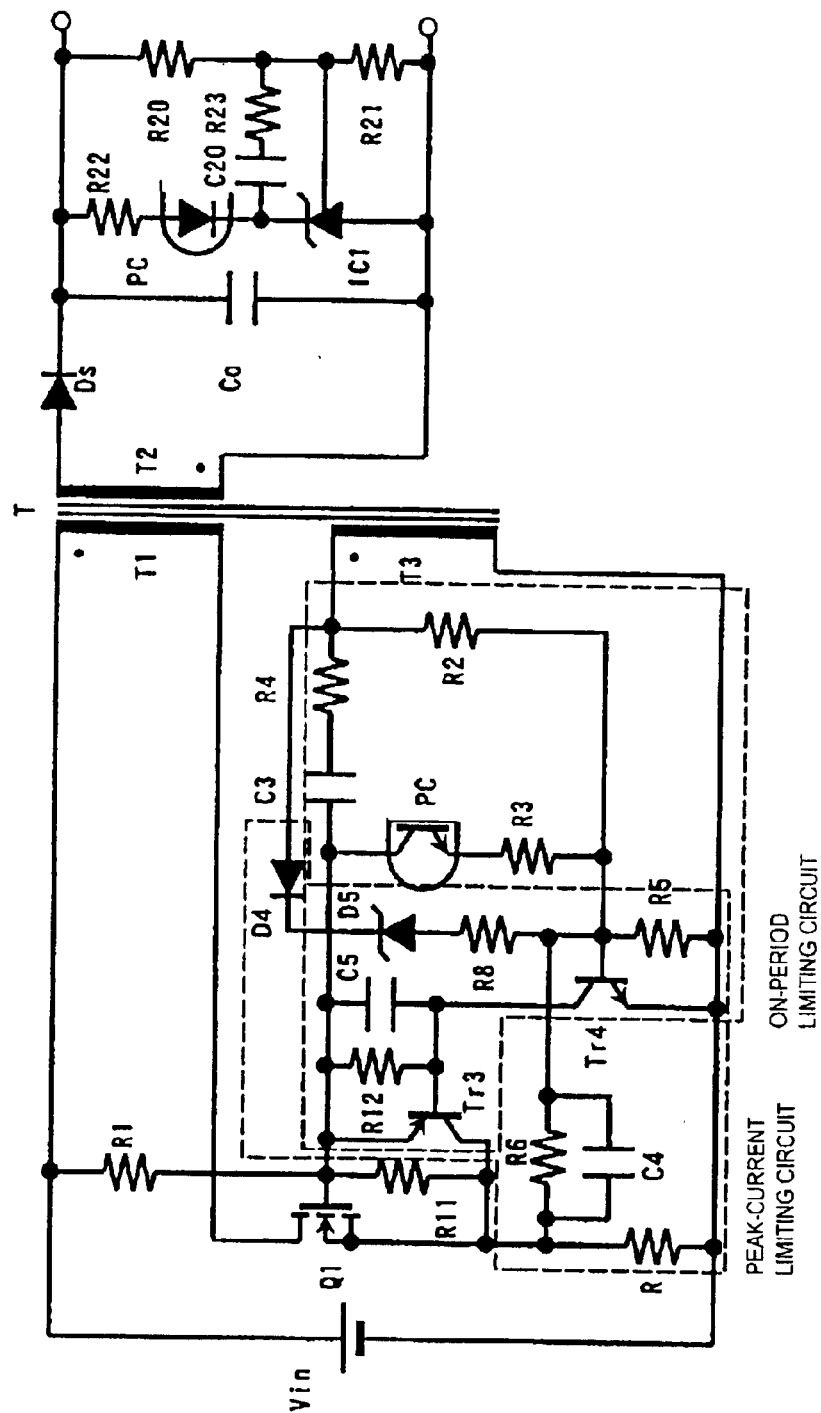
FIG. 10 is a circuit diagram of a switching power source device according to a fifth preferred embodiment of the present invention.

FIG. 10 is a circuit diagram of a switching power source device according to a fifth preferred embodiment of the present invention.

In this circuit, a transistor Tr4 is used instead of the transistors Tr1 and Tr2 of the circuit shown in FIG. 9. When the peak current flowing through the first switching element Q1 reaches a predetermined value, the transistors Tr4 and Tr3 are turned on in that order, and the first switching element Q1 is turned off. This circuit achieves the same advantages as those of the first preferred embodiment. More advantageously, the number of the transistors can be reduced by one compared to that of the first preferred embodiment.

Figure 11:
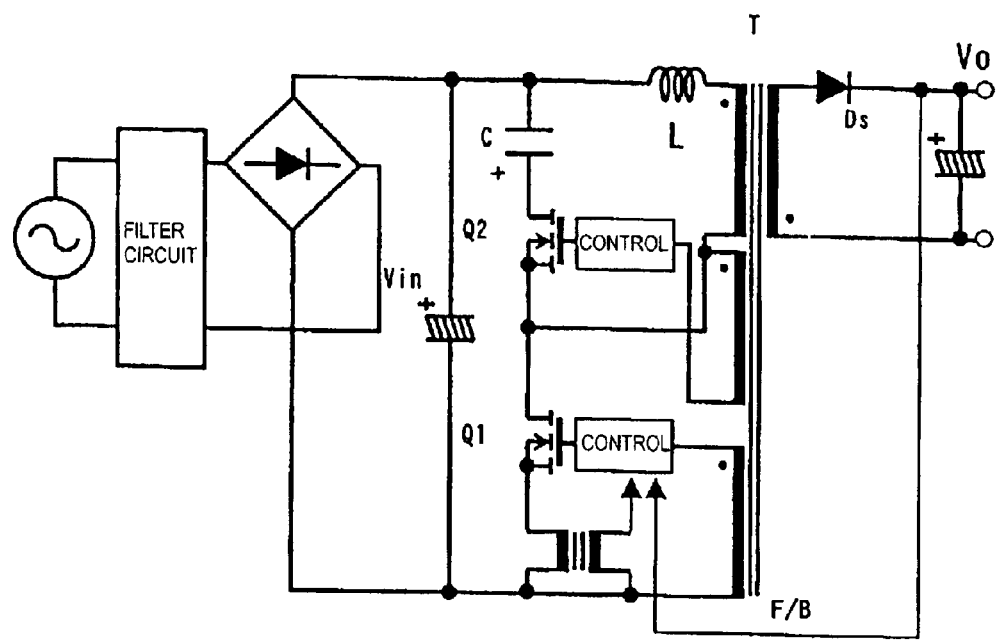
FIG. 11 is a circuit diagram of a switching power source device according to a sixth preferred embodiment of the present invention.

FIG. 11 is a circuit diagram of a switching power source device according to a sixth preferred embodiment of the present invention.

In this two-transistor self-excitation oscillation switching power source device which is operated in a continuous current mode, the input power source uses a voltage obtained by rectifying-smoothing a commercially available power source. As a current-detecting device, a current transformer is preferably used. This device achieves the same advantages as those of the first preferred embodiment. The loss in the output-voltage detection circuit 7 can be reduced by using the current transformer.

Figure 12:
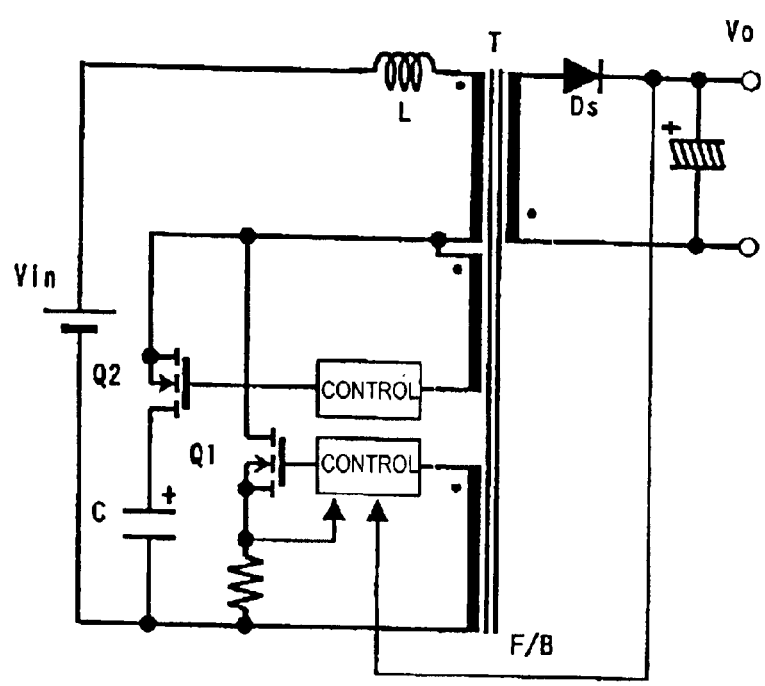
FIG. 12 is a circuit diagram of a switching power source device according to a seventh preferred embodiment of the present invention.

FIG. 12 is a circuit diagram of a switching power source device according to a seventh preferred embodiment of the present invention. In this two-transistor self-excitation oscillation switching power source device which is operated in a continuous current mode, the series circuit including the second switching element Q2 and the capacitor C is connected in parallel to the first switching element Q1.

The capacitance is increased by setting the LC resonance periods at equal values, although the voltage applied to the capacitor C is increased.

Figure 13:
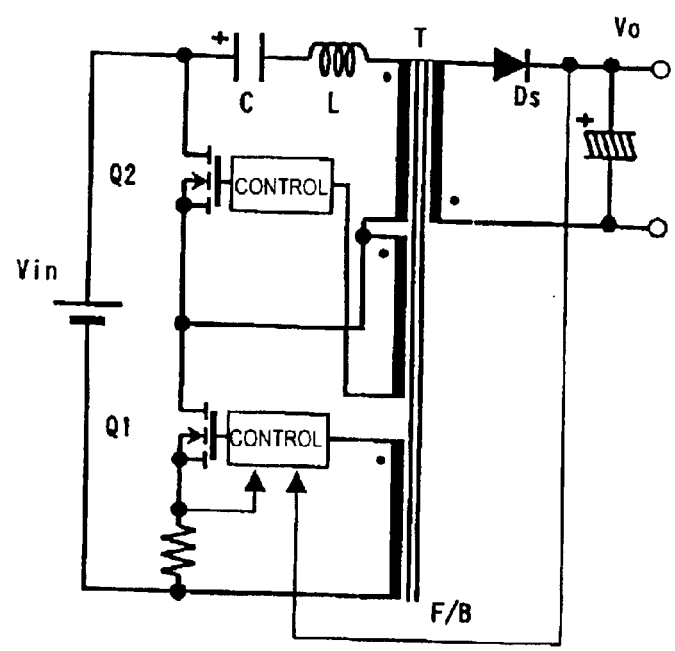
FIG. 13 is a circuit diagram of a switching power source device according to an eighth preferred embodiment of the present invention.

FIG. 13 is a circuit diagram of a switching power source device according to an eighth preferred embodiment of the present invention. In this two-transistor self-excitation oscillation switching power source device which is operated in a continuous current mode, the first switching element Q1 and the second switching element Q2 are connected in series, and the capacitor C and the inductor L are connected in series.

Since only an input voltage is applied to the first switching element Q1 and the second switching element Q2, a FET, which withstands a low voltage, switching element can be applied. In general, a FET has a small on-resistance. Thus, the conduction loss can be reduced, and a high efficiency can be realized.

It should be understood that the foregoing description is only illustrative of the present invention. Various alternatives and modifications can be devised by those skilled in the art without departing from the present invention. Accordingly, the present invention is intended to embrace all such alternatives, modifications and variances which fall within the scope of the appended claims.

What is claimed:

1. A switching power source device which carries out self-excitation oscillation comprising:

a transformer having a primary winding and a secondary winding;

a series circuit including the primary winding of the transformer, a first switching element, a current detection device, and an input power source;

a rectification-smoothing circuit provided for the secondary winding of the transformer;

a switching control circuit connected to a first drive winding provided in the transformer and being operable to turn on/off the first switching element to control the on-period of the first switching element and thereby control the output voltage of the switching power source device, the switching control circuit being controllable to control operation so as to turn on a first switching device connected to a control terminal of the first switching element and thereby turn off the first switching element a predetermined period after the first switching element is turned on by a voltage developed in the first drive winding, the predetermined period being determined by a time constant circuit; and an overcurrent protection circuit including an on-period limiting circuit and a peak current limiting circuit, the on-period limiting circuit being operable to set a maximum on-period of the first switching element with the time constant circuit, the peak current limiting circuit including the current detection device for detecting the peak current flowing through the first switching element, a second switching device which is turned on when the current detected by the current detection device becomes a predetermined peak current, and a third switching device which is turned on by the turning on of the second switching device, the third switching device being connected to a control terminal of the first switching device and whereby the first switching element is turned off by turning on of the third switching device.

2. A switching power source device according to claim 1, wherein the first switching device includes a transistor, and the time constant circuit includes an impedance circuit and a capacitor to be charged and discharged which are connected to a control terminal of the transistor.

3. A switching power source device according to claim 2, wherein the impedance circuit of the time constant circuit includes a photocoupler for changing the impedance and controlling the on-period of the first switching element to thereby control the output voltage of the switching power source device.

4. A switching power source device according to claim 2, wherein the impedance circuit of the time constant circuit sets the impedances at charging and discharging of the capacitor to be charged and discharged in such a manner that the maximum on-period of the first switching element is decreased with the output voltage being reduced.

5. A switching power source device according to claim 2, wherein the switching control circuit has a delay circuit including one of a resistor and a series circuit including a resistor and a capacitor, the delay circuit being provided between the first drive winding and the control terminal of the first switching element, wherein an impedance of the delay circuit is set in such a manner that when the output voltage of the switching power source device is reduced to be lower than a predetermined value, the impedance of the delay circuit prevents the first switching element from turning on caused by the voltage developed in the first drive winding, and the device is operated in an operation mode by which the starting and the stopping are repeated.

6. A switching power source device according to claim 2, wherein the third switching device is connected in parallel to the impedance circuit of the time constant circuit, and the second switching device is turned on when the peak current becomes a predetermined peak current and subsequently the third switching device is turned on to reduce the impedance of the impedance circuit of the time constant circuit, whereby the first switching element is turned off.

7. A switching power source device according to claim 1, wherein the peak current limiting circuit inputs a voltage developed in the first drive winding to a control terminal of the second switching device during the on-period of the first switching element via a resistor and a diode, the voltage being substantially proportional to the input voltage of the device.

8. A switching power source device according to claim 1, wherein the peak current limiting circuit inputs the sum of a first electrical signal which increases with increases in current flowing through the first switching element and a second electrical signal which increases with the output voltage of the switching power source device being reduced to a control terminal of the second switching device, and reduces the on-period of the first switching element with increases in an input electrical signal.

9. A switching power source device according to claim 8, wherein the second electrical signal is arranged such that a fly-back voltage developed in the first drive-winding during the off-period of the first switching element is rectified-smoothed by a diode and a capacitor, a negative electrical potential of the capacitor and the positive electrical potential of the first drive winding are divided by one of a resistor and a resistor and a Zener diode to produce a divided voltage, and the divided voltage is input to the control terminal of the second switching device via the diode.

10. A switching power source device according to claim 1, wherein energy stored in the primary winding during the on-period of the first switching element is released from the secondary winding during the off-period to produce output power.

11. A switching power source device according to claim 10, wherein the switching control circuit is set so that the first switching element is turned off before the energy stored in the primary winding during the on-period of the first switching element is completely released from the secondary winding during the off-period, whereby the switching power source device is operated in a current continuous mode in which the current flowing through the first switching element has a trapezoidal waveform.

12. A switching power source device according to claim 10, wherein the switching control circuit is set so that the first switching element is turned on after the energy stored in the primary winding is released from the secondary winding during the off-period for self-excitation oscillation of the switching power source device when the output voltage is reduced, whereby the current flowing through the first switching element has a triangular waveform.

13. A switching power source device according to claim 1, wherein at least one of the first, second and third switching devices includes a field effect transistor.

14. A switching power source device which carries out self-excitation oscillation comprising:
- a transformer including a primary winding and a secondary winding;
- a first series circuit including the primary winding of the transformer and an inductor;
- a first switching circuit, a current detection device, and an input power source connected in series with the first series circuit;
- a second series circuit including a second switching circuit and a capacitor of which one end is connected to a node of the first series circuit;
- the first switching circuit including a parallel connection circuit including a first switching element, a first diode, and a first capacitor, the second switching circuit including a parallel connection circuit including a second switching element, a second diode, and a second capacitor, the transformer having a first drive winding for generating a voltage which causes the first switching element to conduct, and a second drive winding for generating a voltage which causes the second switching element to conduct a rectification-smoothing circuit provided for the secondary winding of the transformer;
- a switching control circuit for turning on/off the first and second switching elements while a period in which both switching elements are off is interposed between the on/off operations, the switching control circuit being controllable so as to turn on a first switching device connected to a control terminal of the first switching element and thereby turn off the first switching element a predetermined time period after the first switching element is turned on caused by a voltage developed in the first drive winding, the predetermined period being determined by a time constant circuit; and
- an overcurrent protection circuit including an on-period limiting circuit, and a peak current limiting circuit, the on-period limiting circuit being operable to set a maximum on-period of the first switching element with the time constant circuit, the peak current limiting circuit including the current detection device for detecting the peak current flowing through the first switching element, a second switching device which is turned on when the current detected by the current detection device becomes a predetermined peak current, and a third switching device which is turned on by the turning on of the second switching device, the third switching device being connected to the control terminal of the first switching device whereby the first switching element is turned off by turning on of the third switching device.

15. A switching power source device according to claim 14, wherein the first switching device includes a transistor, and the time constant circuit includes an impedance circuit and a capacitor to be charged and discharged which are connected to a control terminal of the transistor.

16. A switching power source device according to claim 15, wherein the impedance circuit of the time constant circuit includes a photocoupler for changing the impedance and controlling the on-period of the first switching element to thereby control the output voltage of the switching power source device.

17. A switching power source device according to claim 15, wherein the impedance circuit of the time constant circuit sets the impedances at charging and discharging of the capacitor to be charged and discharged in such a manner that the maximum on-period of the first switching element is decreased with the output voltage being reduced.

18. A switching power source device according to claim 15, wherein the switching control circuit has a delay circuit including one of a resistor and a series circuit including a resistor and a capacitor, the delay circuit being provided between the first drive winding and the control terminal of the first switching element, wherein an impedance of the delay circuit is set in such a manner that when the output voltage of the switching power source device is reduced to be lower than a predetermined value, the impedance of the delay circuit prevents the first switching element from turning on caused by the voltage developed in the first drive winding, and the device is operated in an operation mode by which the starting and the stopping are repeated.

19. A switching power source device according to claim 15, wherein the third switching device is connected in parallel to the impedance circuit of the time constant circuit, and turns on the second switching device when the peak current becomes a predetermined peak current and subsequently turns on the third switching device to reduce the impedance of the impedance circuit, whereby the first switching element is turned off.

20. A switching power source device according to claim 14, wherein the peak current limiting circuit inputs a voltage developed in the first drive winding to a control terminal of the second switching device during the on-period of the first switching element via a resistor and a diode, the voltage being substantially proportional to the input voltage of the device.

21. A switching power source device according to claim 14, wherein the peak current limiting circuit inputs the sum of a first electrical signal which increases with increases in current flowing through the first switching element and a second electrical signal which increases with the output voltage of the switching power source device being reduced to a control terminal of the second switching device, and reduces the on-period of the first switching element with increases in an input electrical signal.

22. A switching power source device according to claim 21, wherein the second electrical signal is arranged such that the fly-back voltage developed in the first drive-winding during the off-period of the first switching element is rectified-smoothed by a diode and a capacitor, a negative electrical potential of the capacitor and the positive electrical potential of the first drive winding are divided by one of a resistor and a resistor and a Zener diode to produce a divided voltage, and the divided voltage is input to the control terminal of the second switching device via the diode.

23. A switching power source device according to claim 14, wherein energy stored in the primary winding during the on-period of the first switching element is released from the secondary winding during the off-period to produce an output power.

24. A switching power source device according to claim 14, wherein the switching control circuit includes a second on-period control circuit which controls in such a manner so as to turn on a fourth switching device connected to a control terminal of the second switching element to turn off the second switching element a predetermined period after the second switching element is turned on by the voltage developed in the second drive winding, the predetermined period being determined by a time constant circuit of the second on-period control circuit.

25. A switching power source device according to claim 24, wherein the fourth switching device comprises a transistor, and the time constant circuit of the second on-period control circuit comprises an impedance circuit and a capacitor to be charged and discharged which are connected to the control terminal of the transistor.

26. A switching power source device according to claim 25, wherein the time constant of the second on-period control circuit is set so that the first switching element is turned off before the energy stored in the primary winding during the on-period of the first switching element is completely released from the secondary winding during the off-period, whereby the switching power source device is operated in a current continuous mode in which the current flowing through the first switching element has a trapezoidal waveform.

27. A switching power source device according to claim 25, wherein the switching control circuit sets the impedances at charging and discharging of the charge-discharging capacitor of the second on-time control circuit so that the on-period of the second switching element is increased with the output voltage being reduced, whereby the first switching element is turned on after the energy stored in the primary winding is released from the secondary winding during the off-period for self-excitation oscillation of the device, whereby the current flowing through the first switching element has a triangular waveform.

28. A switching power source device according to claim 14, wherein at least one of the first and second switching elements includes a field effect transistor.

29. A switching power source device according to claim 14, wherein the inductor comprises a leakage inductor included in the transformer.

* * * * *